United States Patent [19]

Okura

[11] Patent Number: 5,829,003
[45] Date of Patent: Oct. 27, 1998

[54] RECORD PROCESSING APPARATUS, METHOD AND COMPUTER READABLE STORAGE HAVING ATTRIBUTE INFORMATION REPRESENTING A HIERARCHICAL CONNECTION FOR DISPLAY OF DATA

[75] Inventor: Osamu Okura, Kawagoe, Japan

[73] Assignee: Casio Computer Co., Ltd., Tokyo, Japan

[21] Appl. No.: 644,953

[22] Filed: May 13, 1996

[30] Foreign Application Priority Data

May 23, 1995 [JP] Japan .................................... 7-149391
Jun. 23, 1995 [JP] Japan .................................... 7-157987

[51] Int. Cl.⁶ ........................................................ G06F 17/30
[52] U.S. Cl. .......................... 707/100; 707/907; 707/500; 707/3
[58] Field of Search ................................. 707/4, 3, 100, 707/2, 907, 500

[56] References Cited

U.S. PATENT DOCUMENTS

| | | | |
|---|---|---|---|
| 5,414,838 | 5/1995 | Kolton et al. | 707/104 |
| 5,455,945 | 10/1995 | VanderDrift | 707/2 |
| 5,467,440 | 11/1995 | Nihei | 345/433 |
| 5,467,471 | 11/1995 | Bader | 707/1 |
| 5,581,756 | 12/1996 | Nakabayashi | 707/2 |
| 5,615,367 | 3/1997 | Bennett et al. | 707/102 |
| 5,644,776 | 7/1997 | DeRose et al. | 707/500 |

*Primary Examiner*—Thomas G. Black
*Assistant Examiner*—Greta L. Robinson
*Attorney, Agent, or Firm*—Frishauf, Holtz, Goodman, Langer & Chick

[57] ABSTRACT

Information associated with an organization chart is stored in a personnel database. An organization chart processing program reads out organization chart information from the personnel database and displays the organization chart on the screen of a display device. When a user designates "move" or the like to an employee or a department/section on the organization chart through an input unit, an organization chart editing processing program executes this designation and changes the organization chart. The change contents are reflected on the personnel database. An official announcement processing program forms an official announcement record for an employee subjected to personnel changes upon the change in organization chart and stores the official announcement record in an official announcement history file. This official announcement record is printed out as a written official announcement for personnel changes through a printer.

3 Claims, 21 Drawing Sheets

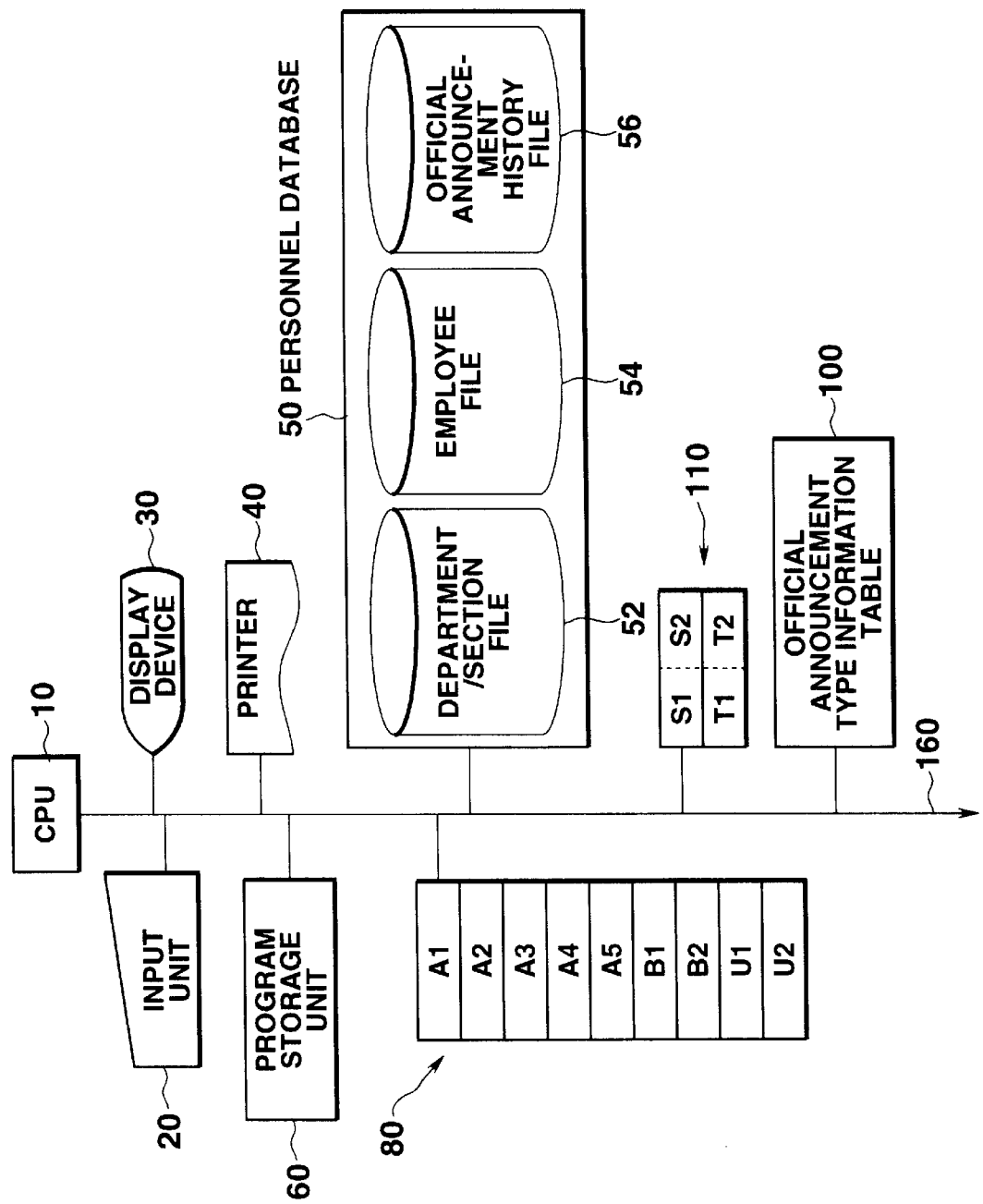

FIG.2A

**52r  DEPARTMENT/
SECTION
RECORD**

| |
|---|
| DEPARTMENT/ SECTION CODE |
| NAME OF DEPARTMENT/ SECTION |
| HIGHER DEPARTMENT/ SECTION CODE |
| COORDINATE DEPARTMENT/ SECTION CODE |
| LOWER DEPARTMENT/ SECTION CODE |
| DEPARTMENT/ SECTION MANAGER |
| DEPARTMENT/ SECTION MEMBER |
| X-COORDINATE |
| Y-COORDINATE |

FIG.2B

**54r  EMPLOYEE
RECORD**

| |
|---|
| DEPARTMENT/ SECTION CODE |
| EMPLOYEE CODE |
| NAME OF EMPLOYEE |
| X-COORDINATE |
| Y-COORDINATE |
| SUPERIOR MEMBER |
| SUBORDINATE MEMBER |

FIG.2C

**56r  OFFICIAL
ANNOUNCEMENT
RECORD**

| |
|---|
| EMPLOYEE CODE |
| TYPE OF OFFICIAL ANNOUNCEMENT |
| OFFICIAL ANNOUNCEMENT DATE |

FIG.7

| | TYPE OF OFFICIAL ANNOUNCEMENT | OPERATION ATTRIBUTE | TOP OF TREE | DEPARTMENT/ SECTION CODE | COORDINATE |
|---|---|---|---|---|---|
| A | PERSONNEL CHANGE | MOVE | HOME COMPANY → HOME COMPANY | CHANGE | |
| B | PERSONNEL CHANGE (PROMOTION) | MOVE | HOME COMPANY → HOME COMPANY | CHANGE | INCREASE IN Y-COORDINATE |
| C | TEMPORARY TRANSFER | MOVE | HOME COMPANY → ANOTHER COMPANY | CHANGE | |
| D | RETURN FROM TEMPORARY TRANSFER | MOVE | ANOTHER COMPANY → HOME COMPANY | CHANGE | |
| E | HOLDING OF ADDITIONAL POST | COPY | HOME COMPANY → HOME COMPANY | CHANGE | |
| F | PROMOTION | MOVE | HOME COMPANY → HOME COMPANY | NO CHANGE | INCREASE IN Y-COORDINATE |
| G | DEMOTION | MOVE | HOME COMPANY → HOME COMPANY | NO CHANGE | DECREASE IN Y-COORDINATE |
| H | ... | ... | ... | ... | ... |
| I | ... | ... | ... | ... | ... |
| ... | ... | ... | ... | ... | ... |

100

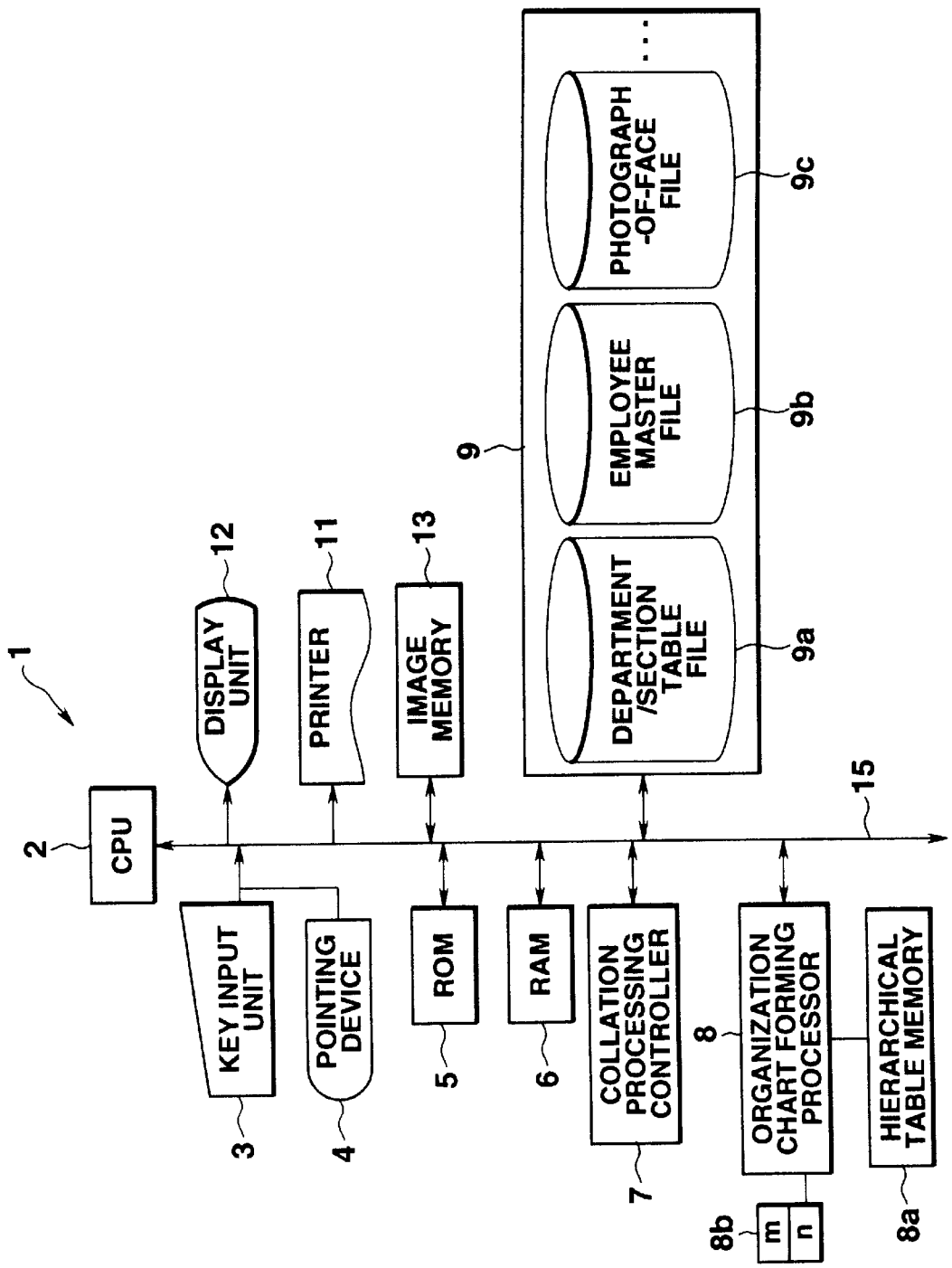

FIG.12

DEPARTMENT/SECTION TABLE

| DEPARTMENT/ SECTION CODE | NAME OF DEPARTMENT/ SECTION | HIGHER DEPARTMENT/ SECTION CODE | HIERARCHICAL NUMBER | EMPLOYEE NUMBER OF DEPARTMENT/ SECTION MANAGER |
|---|---|---|---|---|
| 100 | TIMEPIECE OPERATION DEPARTMENT | | 1 | 0100 |
| 110 | DEVELOPMENT DEPARTMENT | 100 | 2 | 0501 |
| 120 | DESIGN DEPARTMENT | 100 | 2 | 0601 |
| 130 | SALES DEPARTMENT | 100 | 2 | 0701 |
| 111 | DEVELOPMENT SECTION | 110 | 3 | 1201 |
| 131 | FIRST SALES SECTION | 130 | 3 | 1500 |
| 132 | SECOND SALES SECTION | 130 | 3 | 1622 |
| 133 | THIRD SALES SECTION | 130 | 3 | 1701 |

FIG.13

EMPLOYEE MASTER

| EMPLOYEE NUMBER | NAME OF EMPLOYEE | DEPARTMENT/ SECTION CODE | POST | PERSONAL INFORMATION { DATE OF EMPLOYMENT | AGE | FAMILY } |
|---|---|---|---|---|---|---|
| 0100 | A | 100 | OPERATION DEPARTMENT MANAGER | | | |
| 0501 | B | 110 | DEPARTMENT MANAGER | | | |
| 0601 | C | 120 | ASSISTANT DEPARTMENT MANAGER | | | |
| 0701 | D | 130 | DEPARTMENT MANAGER | | | |
| 1201 | E | 111 | SECTION MANAGER | | | |
| 1500 | F | 131 | SECTION MANAGER | | | |
| 1622 | G | 132 | SECTION MANAGER | | | |
| 1701 | H | 133 | SECTION MANAGER | | | |
| 2501 | I | 111 | | | | |
| 2502 | J | 111 | | | | |
| 2503 | K | 120 | | | | |
| 2504 | L | 131 | | | | |
| 2505 | M | 132 | | | | |
| 2506 | N | 133 | | | | |

FIG.16

HIERARCHICAL TABLE MEMORY

| HIERARCHICAL NUMBER | HIGHER HIERARCHICAL LEVEL | NAME OF DEPARTMENT/ SECTION | NAME OF DEPARTMENT/ SECTION MANAGER | NAME OF DEPARTMENT/ SECTION MEMBER | POSITION NUMBER | POSITION LINE | RETRIEVAL FLAG |
|---|---|---|---|---|---|---|---|
| 1 | | | A | | (1,1) | 1 | |
| 2 | 1 | DEVELOPMENT DEPARTMENT | B | | (1,2) | 1 | |
| 3 | 2 | DEVELOPMENT SECTION | E | | (1,3) | 1 | |
| | | | | I | | 2 | |
| | | | | J | | 3 | |
| 2 | 1 | DESIGN DEPARTMENT | C | | (2,2) | 1 | |
| | | | | K | | 2 | |
| 2 | 1 | SALES DEPARTMENT | D | | (3,2) | 1 | |
| 3 | 2 | FIRST SALES SECTION | F | | (3,3) | 1 | |
| | | | | L | | 2 | |
| 3 | 2 | SECOND SALES SECTION | G | | (4,3) | 1 | |
| | | | | M | | 2 | |
| 3 | 2 | THIRD SALES SECTION | H | | (5,3) | 1 | |
| | | | | N | | 2 | |

RECORD PROCESSING APPARATUS, METHOD AND COMPUTER READABLE STORAGE HAVING ATTRIBUTE INFORMATION REPRESENTING A HIERARCHICAL CONNECTION FOR DISPLAY OF DATA

BACKGROUND OF THE INVENTION

1. Field of the Invention

The present invention relates to an editing method and a display method for an apparatus for displaying display data corresponding to a record on a display screen, and a computer readable storage medium for causing a computer to perform the editing/display function.

2. Description of the Related Art

The organizational constitutions of companies and government offices are generally managed by organization charts. In companies and government offices, organizational changes and personnel changes are periodically or nonperiodically performed, and the organization charts are corrected accordingly.

At present, an information processing apparatus can be used to form and manage such an organization chart. The organization chart can be managed as a database in an electronic file. Data is manually input to the database of the organization chart through the information processing apparatus.

Most of the organizational changes and personnel changes are made on paper in a trial and error manner with reference to the latest organization chart. When the organization changes and personnel changes are finally decided, the database of the organization chart is changed with reference to the organization chart newly formed on the paper.

As described above, conventional operations up to the data input to the database of the organization chart can be electronically performed, but operations such as organizational and personnel changes must be manually performed. For this reason, in the operations such as the organizational or personal changes, artificial errors tend to occur. More specifically, a person may belong to a plurality of organizations, or a person may not belong to any organization on the organization chart.

Particularly, in a large organization, when a large number of members are subjected to personnel changes such as periodic personnel changes, the processing capability has limitations in the manual operations described above, and a large number of operation errors tend to occur.

A large number of application programs having database retrieval functions are conventionally popular, and a personnel information system is one of them. In this personnel information system, when a specific employee is designated, his/her personal information can be retrieved from a personnel database, and the retrieved information is displayed/printed. In addition, this personnel information system also has an information collation function of displaying/printing a list of employees satisfying a specific retrieval condition.

In such a conventional information collation function, an employee number is generally input from a keyboard to retrieve corresponding data from the personnel database, thereby displaying the contents of the data. In the display of the list of employees in accordance with specific qualifications or the year of employment, the retrieval condition is often input from a keyboard to display the list of the names of employees and the name of department/section to which the employees belong.

However, in the personnel information system as an application program having the conventional database retrieval function, the contents of a specific employee and the list of employees satisfying a retrieval condition are simply displayed, thus posing the following problem.

That is, in an enterprise, employees have a close relationship with their organization (departments/sections). The capabilities, qualifications, periods of service of members, and the like of a given department are often wanted to be checked in association with organizational posts. As described above, however, these data are simply and two-dimensionally displayed as a list. It is difficult to grasp the relationship between the organization and the detailed personal information.

SUMMARY OF THE INVENTION

It is an object of the present invention to allow an operator to perform operations such as organizational and personnel changes on a screen and to automatically reflect the operation results on the database of an organization chart.

It is another object of the present invention to allow simultaneous observation of the personal information and post of a specific employee in an organization to which he/she belongs.

According to the present invention, information about a connection relationship between departments/sections located on an organization chart is stored in a storage means. Information about each employee belonging to each department/section is stored in an employee information storage means. A display control means displays the organization chart on the screen of a display device on the basis of the department/section information stored in the department/section information storage means and the employee information stored in the employee information storage means. An editing means edits and changes the display position of each individual employee. The editing operations include "move", "copy", and "delete". A user manipulates a pointing device such as a mouse to execute these editing operations. A correction means corrects the contents stored in the employee information storage means so as to correspond to the organization chart changed by the editing means.

According to the present invention, the organization chart is edited. However, the present invention is also applicable to editing processing for all hierarchical charts in which a relationship between a higher hierarchical element (higher hierarchical concept) and a lower hierarchical element (lower hierarchical concept) is expressed by a hierarchical structure. Such a hierarchical chart is exemplified by software design specifications in which a relationship between a main routine and a subroutine is expressed by a hierarchical structure. Therefore, since the hierarchical chart expressed by a tree structure can be corrected with easy operations on the screen, cumbersome, time-consuming operations in changing the organization chart in personnel operations or the like can be greatly reduced. At the same time, the operations can be accurately performed.

According to the present invention, an organization code for each of a plurality of organizations constituting an entity, and connection relationship information representing a relationship between a given organization and another organization are stored in an organization information storage means. Organization information representing a specific organization to which each organization constituent member belongs is stored in an organization information storage means in units of organization constituent members. Information associated with each organization constituent member is stored in a personal information storage means in units of organization constituent members. An organization chart is formed and displayed by an organization chart display means on the basis of the connection relationship information of the organizations and the organization information of the organization constituent members, the organization chart hierarchically expressing the organizations and explicitly indicating a specific organization to which each organization constituent member belongs. When an organization constituent member displayed on the displayed organization chart is designated by a designation means, displaying personal information corresponding to the designated organization constituent member is called by a personal information display means, and the called personal information is displayed.

The pieces of personal information of members designated on the hierarchically displayed organization chart can therefore be simultaneously displayed. The relationship between the position in the organization and the personal information can be easily displayed. The data collation function utilizing a personnel information database can be improved and efficiently utilized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the system configuration of an embodiment of the present invention;

FIGS. 2A to 2C are charts for explaining the formats of a department/section code, an employee code, and an official announcement record, respectively;

FIG. 7 is a chart showing the format of official announcement records formed in execution of operations for the personnel changes shown in FIG. 6;

FIG. 11 is a block diagram showing the main part of a computer system to which the second embodiment is applied;

FIG. 12 is a chart showing the data structure of a table stored in a department/section table file in FIG. 11;

FIG. 13 is a chart showing the data structure of a master file stored in an employee master file shown in FIG. 11;

FIG. 16 is a chart showing data stored in a hierarchical table memory in FIG. 11 by the organization chart formation processing in FIG. 15;

DETAILED DESCRIPTION OF THE PREFERRED EMBODIMENTS

Figure 3B:
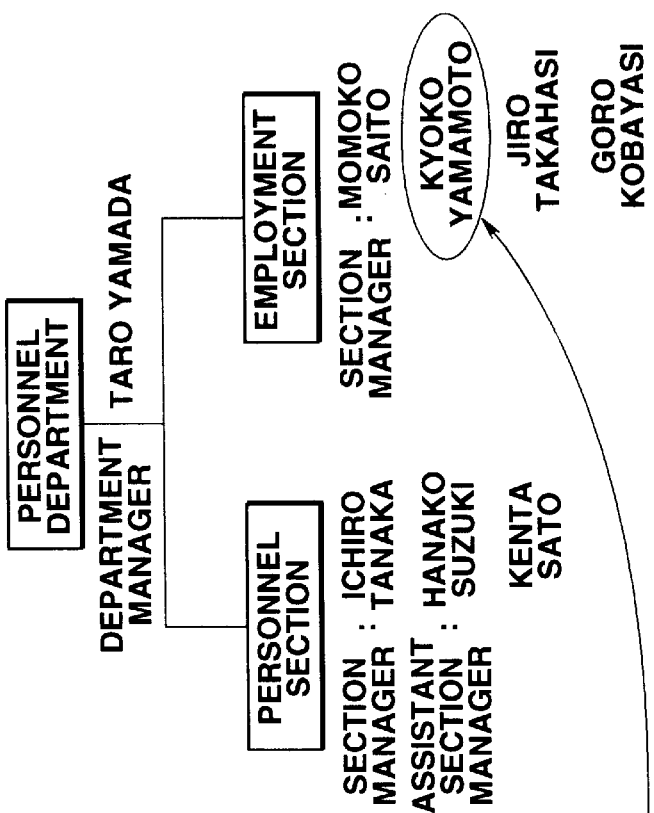
FIGS. 3A and 3B are charts showing an operation in, a personnel change in units of individuals.

The first embodiment of the present invention will be described with reference to the accompanying drawings.

FIG. 1 is a block diagram showing the system configuration of a personnel data processing apparatus according to the first embodiment of the present invention.

A CPU 10 is a central processing unit for controlling the entire system. The CPU 10 executes a program stored in its internal memory to execute personnel change processing and official announcement processing for personnel changes.

An input unit 20 includes a keyboard having data input keys and a pointing device such as a mouse. Operation information at this input unit 20 is sent to the CPU 10 through an input controller (not shown).

A display device 30 comprises a CRT display, an LCD (Liquid Crystal Display), or the like. The display device 30 displays the drawings of an organization chart and a menu for correcting the organization chart under the control of the CPU 10.

A printer 40 comprises a page printer, a serial printer, or the like. The printer 40 prints out a written official announcement for a personnel change under the control of the CPU 10.

A personnel database 50 is a database for managing the organization chart using an electronic file. The personnel database 50 comprises a department/section file 52, an employee file 54, and an official announcement history file 56.

The department/section file 52 is a file storing information about each department/section constituting a company.

The employee file 54 is a file storing, in units of employees, information about employees belonging to a company.

The official announcement history file 56 is a file in which an official announcement for a personnel change formed in official announcement processing is registered. By retrieving this file, the history of the personnel changes of each employee can be known.

The record structures of these files 52, 54, and 56 will be described in detail later.

A first register group 80 comprises a plurality of registers used as work registers in execution of editing processing for the organization chart. More specifically, the first register group 80 comprises five registers A1, A2, A3, A4, and A5 for storing records of the employee file 54, two registers B1 and B2 for storing records of the department/section file 52, and registers U1 and U2 for storing Y-coordinates of positions designated by the user on the organization chart displayed on the screen.

An official announcement type information table 100 is a table looked up when an official announcement type item as one of the items set in a record 56r is decided in forming the record 56r. The structure of this table 100 will be described in detail later.

A second register group 110 comprises a plurality of registers used as work registers in executing editing processing of the organization chart. That is, the second register group 110 comprises four registers S1, S2, T1, and T2. The register S1 stores the department/section code of a first employee designated as an operation target for "move" or "copy" on the organization chart. The register S2 stores the department/section code of a second employee located at a position closest to a position designated as a move or copy destination in the "move" or "copy" operation.

The register T1 stores the department/section code of a president or chairman as the head of the organization to which the first employee belongs. The register T2 stores the department/section code of a president or chairman as the head of an organization to which the second employee belongs.

Reference numeral 60 denotes a program storage unit having a storage medium in which programs necessary for various types of processing such as organization chart formation processing, organization chart editing processing, and official announcement processing are stored in advance.

This recording medium comprises a magnetic storage medium, an optical storage medium, or a semiconductor memory. This storage medium can be arranged permanently or detachably in the storage device. The programs stored in the storage medium may be received and stored from a remote equipment connected through a communication line. Alternatively, a storage device having the storage medium may be arranged on the remote equipment connected through the communication line, and a program stored in this storage medium may be used through the communication line.

Of all the programs stored in the program storage unit 60, an organization chart formation processing program 26 is a support tool for allowing a user to form an organization chart through the input unit 20.

The program comprises software executed by the CPU 10 or dedicated hardware. The organization chart is formed through, e.g., an organization chart formation input screen displayed on the display device 30. The organization chart formation processing program 62 also controls the display of the input screen and initially forms the department/section file 52 and the employee file 54 of the personnel database 50.

Of the programs stored in the program storage unit 60, an organization chart editing processing program is a tool for allowing the user to edit, through the input unit 20, the organization chart displayed on the screen of the display device 30. The program comprises software executed by the CPU 10 or dedicated hardware. The organization chart editing processing program 64 also controls the screen display of the organization chart. Note that the screen display is performed by reading out the department/section file 52 and the employee record 54r from the department/section file 52 and the employee file 54.

Of all the programs stored in the program storage unit 60, an official announcement processing program is a tool for forming the official announcement record 56r for personnel changes upon a change in organization chart. The program comprises software executed by the CPU 10 or detected hardware.

The CPU 10, the input unit 20, the display device 30, the printer 40, the personnel database 50, the program storage unit 60, the first register group 80, and the second register group 110 are connected to each other through a bus 160.

FIGS. 2A to 2C are views showing formats of records of the respective files 52, 54, and 56 constituting the personnel database 50.

FIG. 2A is a view showing the format of the record (department/section record) 52r stored in the department/section file 52.

The department/section record 52r is a record formed in units of departments/sections on the organization chart and is constituted by the following items: a "department/section code", the "name of department/section", a "higher department/section code", a "coordinate department/section code", a "lower department/section code", a "department/section manager", a "department/section member", an "X-coordinate", and a "Y-coordinate".

Department/Section Code: a code uniquely assigned to a given department/section. Specific codes are assigned to the department/section codes of the top (e.g., the president or chairman) of the organization charts having tree structures of the holding and subsidiary companies so as to distinguish the management division of the holding company from that of the subsidiary company.

Name of Department/Section: the name of the given department/section.

Higher Department/Section Code: the code of the department/section higher than a given department/section in the organization chart.

Coordinate Department/Section Code: the code of a department/section coordinate with the given department/section in the organization chart.

Lower Department/Section Code: the code of a department/section lower than the given department/section in the organization chart.

Department/Section Manager: a manager who manages the given department/section.

Department/Section Member: the code of each employee who is subordinate to the manager who manages the given department/section.

X-Coordinate: the X-coordinate of a display position of the name of the given department/section on the screen of the display device 30.

Y-Coordinate: the Y-coordinate of a display position of the name of the given department/section on the screen of the display device 30.

Of all the items, the items of "higher department/section code", "coordinate department/section code", and "lower department/section code" are used to manage the chain relationship between the departments/sections in the organization chart having a tree structure.

The orthogonal X-Y coordinate system having the lower left corner as the origin on the screen is set on the screen of the display device 30. That is, the Y-axis represents a vertical vector directed upward on the screen.

FIG. 2B is a view showing the format of the record (employee record) 54r stored in the employee file 54.

The employee code 54r is a record formed for each employee in the organization chart and is constituted by the following items: a "department/section code", an "employee code", the "name of employee", an "X-coordinate", a "Y-coordinate", a "superior member", and a "subordinate member".

Department/Section Code: a code uniquely assigned to a department/section to which a given employee belongs.

Employee Code: a code uniquely assigned to the given employee.

Name of Employee: the name of the given employee.

X-Coordinate: the X-coordinate of the display position of the name of the given employee on the screen of the display device 30.

Y-Coordinate: the Y-coordinate of the display position of the name of the given employee on the screen of the display device 30.

Superior Member: the employee code of a member (superior member) superior to the given employee in the given department/section in a company.

Subordinate Member: the employee code of a member (subordinate member) subordinate to the given employee in the given department/section in a company.

Of all the items, the items of "superior member" and "subordinate member" are used as link information for managing the superior/subordinate relationship between the employees in the department/section.

FIG. 2C is a view showing the format of the record (official announcement record) 56r stored in the official announcement history file 56.

The official announcement record 56r is a record used for forming a written official announcement to an employee subjected to a personnel change. The record 56r is constituted by the following items: an "employee code", a "type of official announcement", and an "official announcement date".

Employee Code: the employee code of a given employee subjected to a given personnel change.

Type of Official Announcement: information representing the type of the given personnel change announced to the given employee.

Official Announcement Date: the date of the given personnel change.

The operation of this embodiment having the above arrangement will be described below.

Figure 3A:
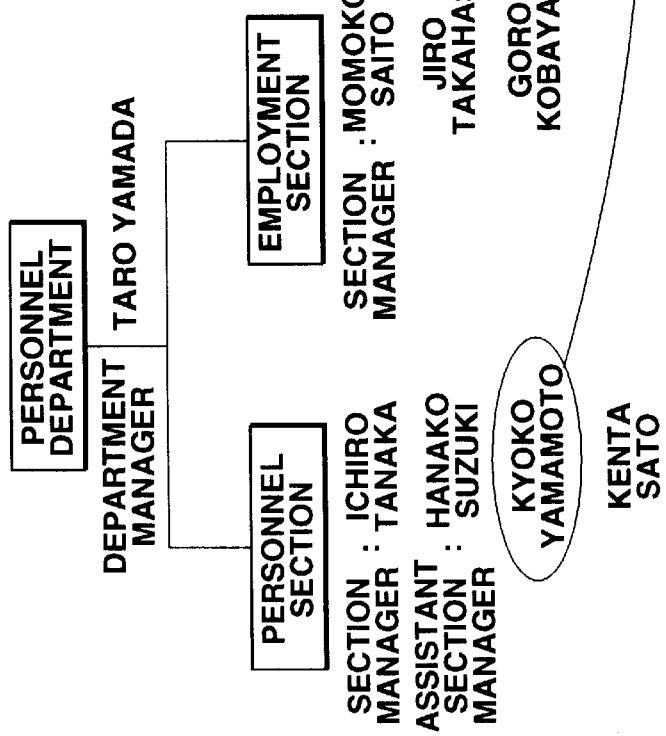

FIG. 3A is a view showing an organization chart displayed on the screen of the display device 30.

FIG. 3A shows the organization chart of a personnel department formed by the organization chart formation processing program. The personnel department consists of a personnel section and an employment section. The personnel department is managed by a department manager named "Taro Yamada". The personnel section as a subordinate section of the personnel department is managed by an assistant section manager named "Ichiro Tanaka". The employment section is managed by an assistant section manager named "Momoko Saito".

This organization section is a kind of hierarchical chart. The personnel department, the personnel section, and the employment section constitute blocks each constituted by one or more members (elements). These blocks are connected in a tree-like manner to constitute the hierarchical chart having a tree structure.

The organization chart of the personnel department can be changed by the organization chart editing processing program.

FIG. 3B is a view showing the organization chart of the personnel section which is changed by the organization chart editing processing program. As can be apparent from the comparison between FIGS. 3A and 3B, "Kyoko Yamamoto" belonging to the personnel section is subjected to a personnel change to the employment section in accordance with the above change. In this personnel change, "Kyoko Yamamoto" becomes a service superior of "Jiro Takahashi".

This operation is performed by, e.g., designating "Kyoko Yamamoto" subjected to a "move" target. This designation is performed by clicking a mouse or the like. The position of "Jiro Takahashi" of the employment section is designated as the "move" destination of "Kyoko Yamamoto". This designation is also performed with the above mouse operation.

Except for the above operations, a pointing device such as a mouse is used to drag the display of "Kyoko Yamamoto" and drop it to the position of "Jiro Takahashi" of the employment section.

With the above operations, the display positions of "Jiro Takahashi" and "Goro Kobayashi" are moved downward (downward along the Y-axis) on the screen, and "Kyoko Yamamoto" is displayed at the original position of "Jiro Takahashi".

Figure 4:
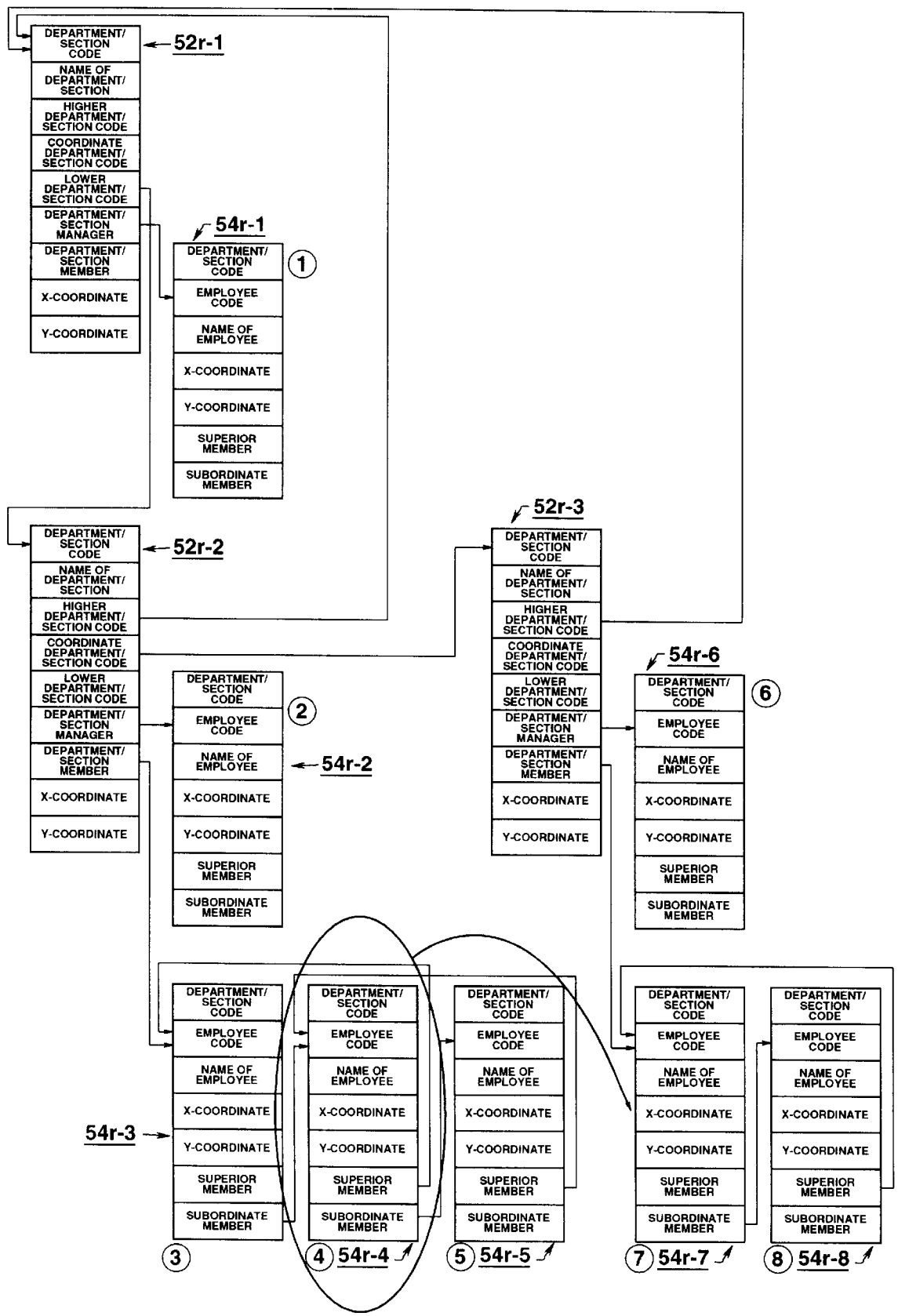
FIG. 4 is a chart for explaining the internal structure of a personnel database 50 which manages an organization chart having a tree structure shown in FIG. 3A.

FIG. 4 is a view showing the data structure of the database constituted by the department/section file 52 and the employee file 54 which correspond to the organization chart shown in FIG. 3A.

FIG. 4 shows three department/section records 52r-1, 52r-2, and 52r-3 stored in the department/section file 52. The department/section record 52r-1 is a personnel department record 52r, and the department/section records 52r-2 and 52r-3 are personnel and employment section records 52r.

FIG. 4 shows eight employee records 54r marked with 54r-1 to 54r-8 and stored in the employee file 54. The employee records 54r marked with to are employee records 54r of the employees belonging to the personnel department. That is, Employee Record 54r: an employee record 54r-1 of "Taro Yamada" as the department manager of the personnel department.

Employee Record 54r: an employee record 54r-2 of "Ichiro Tanaka" as the assistant section manager of the personnel section.

Employee Record 54r: an employee record 54r-3 of "Hanako Suzuki" as the member of the personnel section.

Employee Record 54r: an employee record 54r-4 of "Kyoko Yamamoto" as the member of the personnel section.

Employee Record 54r: an employee record 54r-5 of "Kenta Sato" as the member of the personnel section.

Employee Record 54r: an employee record 54r-6 of "Momoko Saito" as the assistant section manager of the employment section.

Employee Record 54r: an employee record 54r-7 of "Jiro Takahashi" as the member of the employment section.

Employee Record 54r: an employee record 54r-8 of Goro Kobayasi as the member of the employment section.

The department/section records 52r-1 to 52r-3 are linked with the employee records 54r-1 to 54r-8 in accordance with the organization structure of the personnel department.

More specifically, the item of "lower department/section code" of the personnel department record 52r-1 indicates the personnel section record 52r-2 which represents the personnel section as the subordinate section of the personnel department. The item of "department/section manager" indicates the personnel record 54r-1 of "Taro Yamada" as the department manager of the personnel department.

The item of "higher department/section code" of the personnel section record 52r-2 indicates the personnel department record 52r-1. The item of "coordinate department/section code" of the personnel section record 52r-2 indicates the employment section record 52r-3. The item of "department/section manager" of the personnel section record 52r-2 indicates the employee record 54r-2 of "Ichiro Tanaka" as the assistant section manager of the personnel section. The item of "member" of the record 52r-2 indicates the employee record 54r-3 of "Hanako Suzuki" as the highest subordinate member (chief clerk) of "Ichiro Tanaka".

The item of "subordinate member" of the employee record 54r-3 of "Hanako Suzuki" indicates the employee record 54r-4 of "Kyoko Yamamoto" as the highest subordinate member. The item of "superior member" of the employee record 54r-4 of "Kyoko Yamamoto" indicates the employee record 54r-3 of "Hanako Suzuki" as the service superior. The item of "subordinate member" of the record 54r-4 indicates the employee record 54r-5 of "Kenta Sato" who is ranked at a lower post than that of "Kyoko Yamamoto" but is a colleague. The item of "superior member" of the employee record 54r-5 of "Kenta Sato" indicates the employee record 54r-4 of "Kyoko Yamamoto" of his direct service superior.

The item of "higher department/section" of the employment section code 52r-3 indicates the personnel department record 52r-1, and the item of "department/section manager" of the code 52r-3 indicates the employee record 54r-6 of "Momoko Saito" as the employment section manager. The item of "member" of the record 52r-3 indicates the employee record 54r-7 of "Jiro Takahashi" as the highest subordinate member of "Momoko Saito".

The employee record 54r-7 of "Jiro Takahashi" indicates the employee record 54r-8 of "Goro Kobayashi" located next to "Jiro Takahashi". The item "superior member" of the employee record 54r-8 of "Goro Kobayashi" indicates the employee code 54r-7 of "Jiro Takahashi" as the service superior of Mr. Kobayashi.

The organization chart editing processing program obtains the link information of the department/section records 52r and the employee records 54r, as described above, from the department/section file 52 and the employee file 54 and displays the organization chart shown in FIG. 3A on the screen of the display device 30.

Figure 5:
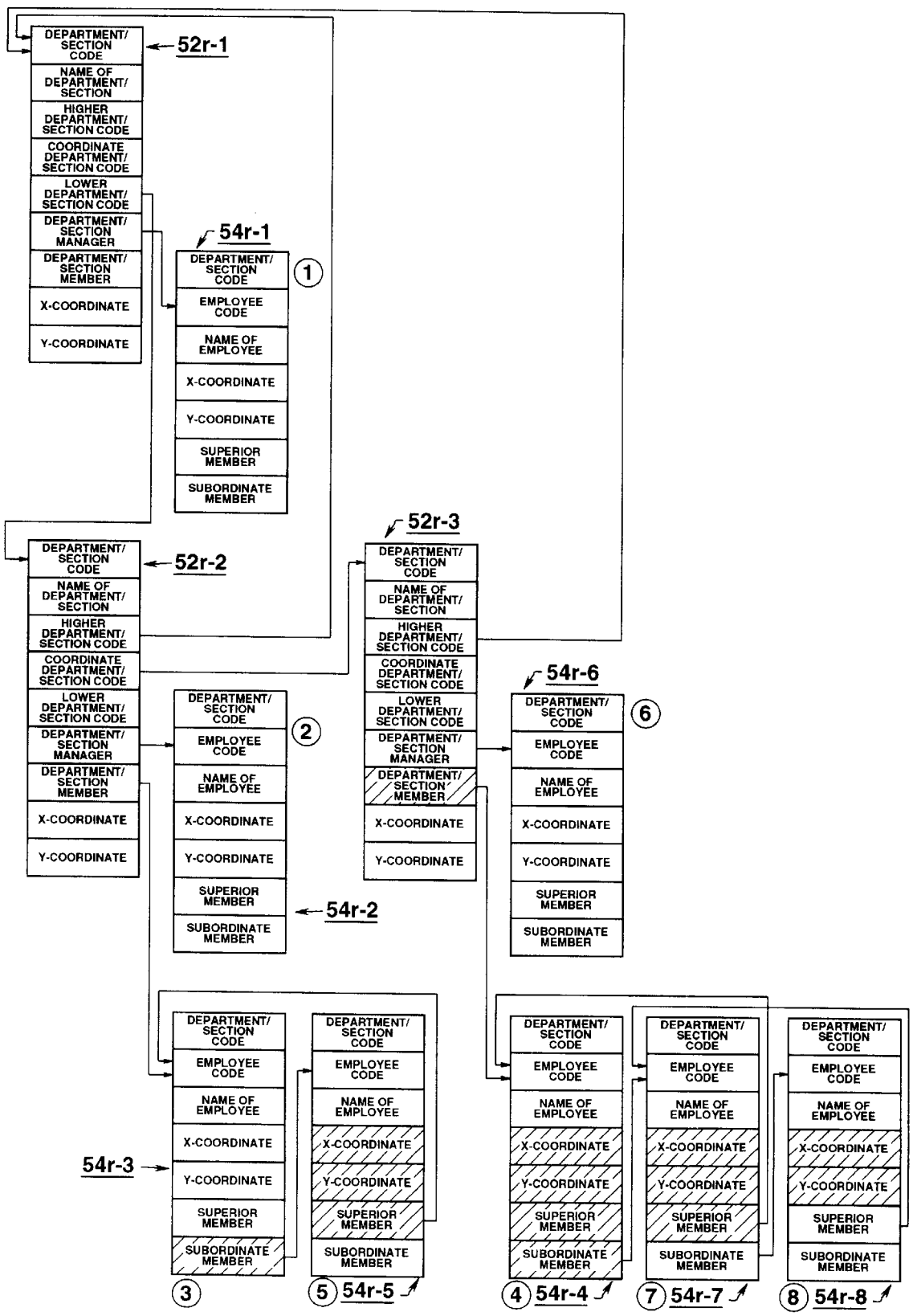
FIG. 5 is a chart for explaining the internal structure of the personnel database 50 which manages an organization chart having a tree structure shown in FIG. 3B.

FIG. 5 is a view showing the data structure of the organization chart of the personnel department in the department/section file 52 and the employee file 54 which are changed by the organization chart editing processing program when the personnel changes shown in FIG. 3B are made.

Referring to FIG. 5, the records having the items marked with oblique lines extending downward to the left or right are the records whose data have been changed. More specifically, in addition to the employee record 54r-4 of "Kyoko Yamamoto" as the personnel change target, the employee records 54r-3 and 54r-5 of "Hanako Suzuki" and "Kenta Sato" of the personnel section and the employee records 54r-7 and 54r-8 of "Jiro Takahashi" and "Goro Kobayashi" of the employment section are changed. The employment section record 52r-3 is also changed.

In this case, "Kyoko Yamamoto" as the subordinate member of "Hanako Suzuki" is changed from the personnel section to the employment section. At the same time, since "Kyoko Yamamoto" becomes the service superior of "Jiro Takahashi" in the employment section, the display positions of "Hanako Suzuki", "Kenta Sato", "Jiro Takahashi," and "Goro Kobayashi" are changed on the screen, and the member constitutions in the personnel and employment sections are changed.

The detailed change contents and their reasons of the employee records 54r subjected to the above changes will be described with reference to FIG. 5.

The change contents of the employee records 54r of the personnel section will be described below. The employee record 54r-3 of "Hanako Suzuki" is changed such that its subordinate member indicates the employee record 54r-5 of "Kenta Sato" because "Kyoko Yamamoto" who was the subordinate member is changed to the employment section and the subordinate member of "Kyoko Yamamoto" becomes "Kenta Sato".

The employee record 54r-5 of "Kenta Sato" is changed such that the item of its "service superior" indicates the employee record 54r-3 of "Hanako Suzuki" because "Kyoko Yamamoto" who was the service superior of "Kenta Sato" is changed to the employment section and "Hanako Suzuki" becomes his service superior. The items of "X-coordinate" and "Y-coordinate" of the display position of "Kenta Sato" are changed to the position where "Kyoko Yamamoto" was displayed (i.e., the Y-coordinate is increased).

On the other hand, the item of "member" of the employment section record 52r-3 is changed to indicate the department/section record 52r-4 of "Kyoko Yamamoto" because "Kyoko Yamamoto" becomes the highest subordinate member of "Momoko Saito" who serves as the employment section manager.

With the change in display position, the items of "X-coordinate" and "Y-coordinate" of the employee record 54r-4 of "Kyoko Yamamoto" are changed to the position where "Jiro Takahashi" was displayed (in this case, the Y-coordinate is increased). In addition, the item of "superior member" is cleared because "Kyoko Yamamoto" is located at the highest post among the colleagues, and the item of "subordinate member" is changed to indicate the employee record 54r-7 of "Jiro Takahashi".

The items of "X-coordinate" and "Y-coordinate" of the employee record 54r-7 of "Jiro Takahashi" are changed to the lower position because "Kyoko Yamamoto" becomes his service superior (in this case, the Y-coordinate is decreased). The item of "superior member" of "Jiro Takahashi" is changed to indicate the employee record 54r-4 of "Kyoko Yamamoto".

The items of "X-coordinate" and "Y-coordinate" of the employee record 54r-8 of "Goro Kobayashi" are changed to a lower position because the display position of "Goro Kobayashi" is lowered similarly to "Jiro Takahashi" (in this case, the Y-coordinate" is decreased).

Figure 6:
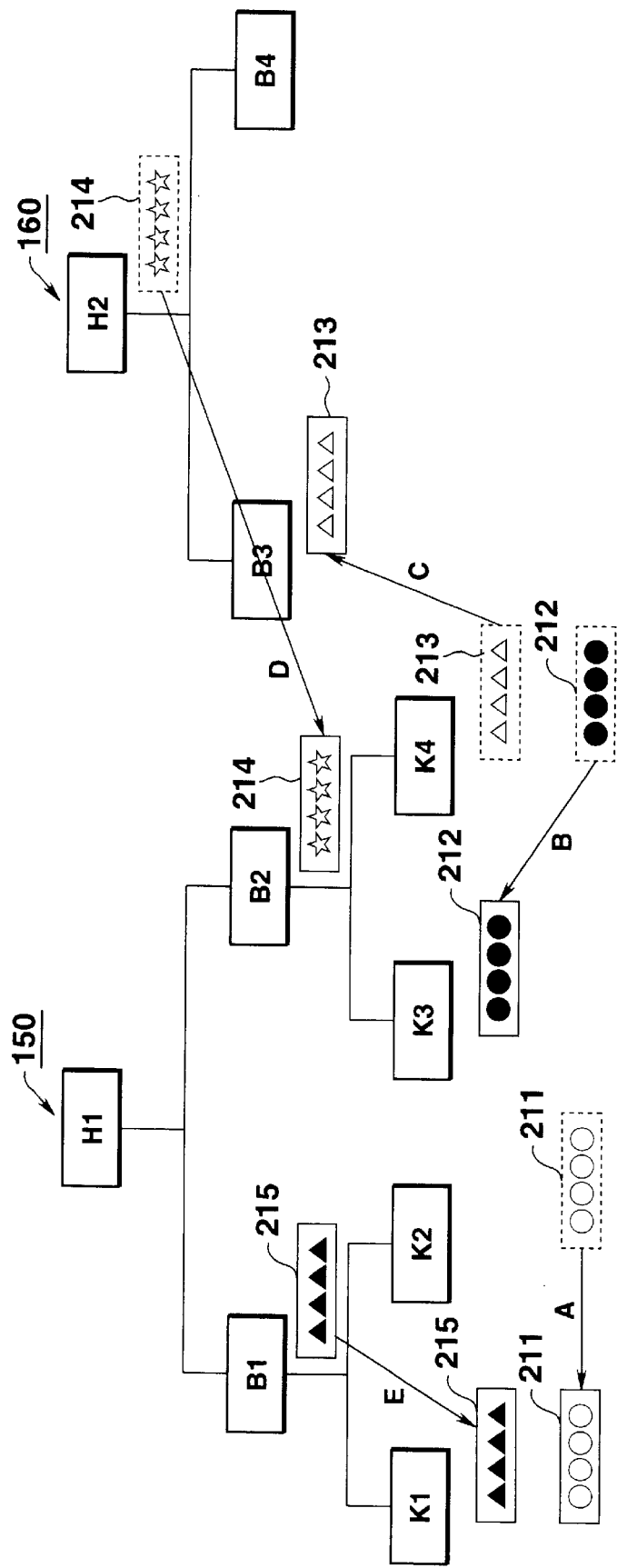
FIG. 6 is a chart for explaining the types of operations on the screen in personnel changes on the basis of the organization chart of this embodiment.

FIG. 6 is a view showing the form of the organization chart displayed on the screen of the display device 30 and an operation for editing the organization chart on the screen. The display screen shown in FIG. 6 indicates organization charts 150 and 160 of two companies which have tree structures. Various operations associated with the personnel changes based on the organization charts 150 and 160 are shown in FIG. 6.

The organization chart 150 is of a holding company, and the organization chart 160 is of its subsidiary company. The organization chart 150 has a head office H1, and the head office H1 has two departments B1 and B2. The department B1 has two sections K1 and K2. More specifically, in this organization chart 150 as the hierarchical chart having the tree structure, the head office H1 is located at the top of the tree. The departments B1 and B2 belong to the head office H1, and the sections K1 and K2 belong to the department B1. The head office H1, the departments B1 and B2, and the sections K1 and K2 constitute blocks each having one or more employees as the constituent members. The blocks are connected in a tree-like manner.

The organization chart 160 has a head office H2, and the head office H2 has two departments B3 and B4. In this organization chart 150 as the hierarchical chart having a tree structure, the head office H2 is located at the top of the tree, and the departments B3 and B4 belong to the head office H2. The head office H2 and the departments B3 and B4 constitute blocks each having one or more employees as the constituent members. These blocks are connected in a tree-like manner.

Referring to FIG. 6, rectangles 211, 212, 213, 214 and 215 indicated by the broken or solid lines indicate the displays of employees. Rectangles marked with the same reference numerals indicate the same employee regardless of the broken and solid lines. Arrows A, B, C, D, and E indicate operations for the employees 211 to 215 subjected to the personnel changes executed on the screen of the display device 30.

The arrows A, B, C, and D directed from the rectangles (211, 212, 213, and 214) indicated by the broken lines to the rectangles (211, 212, 213, and 214) indicated by the solid lines indicate "move" operations. The arrow E directed from the rectangle (215) indicated by the solid line to the rectangle (215) indicated by the solid line indicates a "copy" operation. These "move" and "copy" operations are performed with function keys or a pointing device such as a mouse.

An operation indicated by the arrow A is an operation for moving the employee 211 from the section K2 to the section K1 in the holding company. In this case, since the sections K1 and K2 belong to the same department B1, this operation is defined as "personnel change" as the type of official announcement for personnel changes. In this case, the Y-coordinate of the employee 211 does not change, so that this change is a simple personnel change between the sections.

An operation indicated by the arrow B is an operation for moving the employee 212 from the section K4 to the section K3 in the holding company. In this case, since the sections K4 and K3 belong to the same department B2, this operation is defined as "personnel change" as the type of official announcement for personnel changes. In this case, the Y-coordinate of the employee 212 is increased, and this change is finally defined as "personnel change (promotion)".

An operation indicated by the arrow C is an operation for moving the employee 213 from the section K4 of the holding company to the department B3 of the subsidiary company. This change is defined as "temporal transfer" as the type of official announcement for personnel changes.

An operation indicated by the arrow D is an operation for moving the employee 214 from the head office H2 located at the top of the tree of the organization chart of the subsidiary company to the department B2 of the holding company H1. This change is defined as "return from temporary transfer" as the type of official announcement for personnel changes.

An operation indicated by the arrow E is an operation for "copying" the employee 215 to belong to both the department B1 and the section K1 in the holding company. This "copy" operation is defined as "holding of additional post" as the type of official announcement for personnel changes.

The operations shown in FIG. 6 are personnel change operations based on the organization charts. In this embodiment, various other personnel change operations such as "promotion" and "demotion" within the same department/section are also performed.

The official announcement processing program official announcement records 56r each having the format shown in FIG. 2C for the employees 211 to 215 upon execution of the operations (FIG. 6) on the organization chart.

FIG. 7 is a view showing the contents of the official announcement type information table 100 looked up by the official announcement processing program to form the official announcement records 56r in correspondence with the operations A to E.

The first line of the official announcement type information table 100 is constituted by items of "type of official announcement", "operation attribute", "top of tree", "department/section code", and "coordinate" for a target employee (given employee).

"Type of Official Announcement": the types of official announcements for personnel changes (e.g., "personnel change", "personnel change (promotion)", "temporary transfer", "return from temporary transfer", "holding of additional post", "promotion", and "demotion").

"Operation Attribute": the types of operations on the organization chart displayed on the screen.

"Top of Tree": information representing the pattern of a change in top of the tree of the organization chart to which the target employee belongs, before and after this operation.

"Department/Section Code": information representing the presence/absence of a change in department/section code of a department/section to which a target employee belongs, before and after this operation.

"Coordinate": information representing the direction of a change in Y-coordinate of the position of the given employee on the organization chart before and after this operation.

When a "move" or "copy" operation is executed for an employee on the organization chart displayed on the screen of the display device 30, the official announcement processing program reads out the contents of the item of "type of official announcement" which match the contents of the items of "operation attribute", "top of tree", "department/section code", and "coordinate" from the official announcement type information table 100, thereby determining the type of official announcement.

Although not shown in FIG. 6, the editing operation for editing the organization chart on the screen in this embodiment also includes an operation G for "promoting" or "demoting" an employee within the same department/section. The contents of the above items of official announcement type information for this operation G are also registered in the official announcement type information table 100. The contents of all the items of the "types of announcements" corresponding to all the operations on the organization chart which are executed in this embodiment are also registered. The contents of the items of the "type of official announcement" for a "delete" operation are also registered.

The operation of this embodiment will be described with reference to a flow chart in FIG. 8. A program for realizing each function described in this flow chart is stored in the program storage unit 60 in the form of program codes readable by the CPU 10.

A current organization chart is formed on the basis of the department/section file 52 and the employee file 54 of the personnel database 50 (S1).

The formed organization chart is displayed on the screen of the display device 30 (S2). By these processing operations, the organization chart shown in FIG. 3A is displayed on the screen.

A "move" or "copy" operation is designated by a user at the input section 20 so as to execute personnel change processing for the above organization chart (S3).

When the above designation is made, a message, e.g., representing that "please designate the position (original position) of an employee or department/section to be moved or copied" is displayed in the message display area of the screen of the display device 30.

When the above message is displayed, the user designates the target employee or department/section with a pointing device such as a mouse arranged in the input unit 20 (S4).

This designation is performed by clicking, e.g., an employee display area or the rectangular frame of a department/section with a mouse.

The Y-coordinate of the designated position is stored in the register U1 (S5).

It is determined with reference to the department/section file 52 whether the above designated position is the display position of the department/section (S6). More specifically, in this case, the items of "X-coordinate" and "Y-coordinate" of the department/section record 52r of the department/section which is stored in the department/section file 52 and located on the organization chart currently displayed on the screen of the display device 30 are looked up to determine whether the designated position falls within the rectangular frame of the department/section. The items of "X-coordinate" and "Y-coordinate" of the employee record 54r which is stored in the employee file 54 and currently displayed on the screen of the display device 30 are looked up to determine whether the designated position falls within the employee display area.

If the designated position is the employee display position (NO in step S6), "move" or "copy" processing is executed to move or copy the employee to the position designated by the user on the organization chart displayed on the screen (S7). This employee "move" or "copy" processing in step S7 is processing corresponding to each operation shown in FIG. 6.

Figure 9:
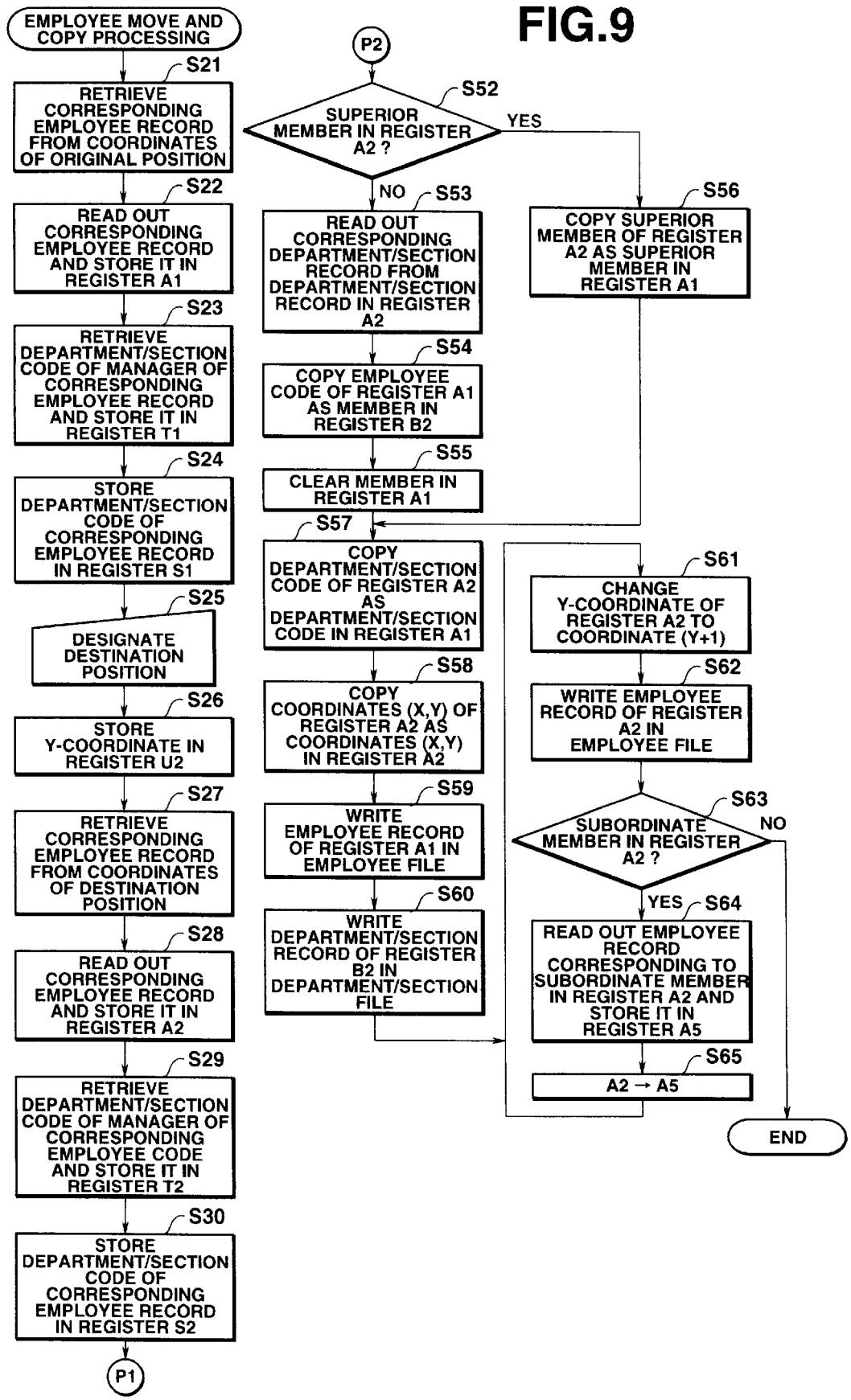
FIG. 9 is a flow chart (No. 1) for explaining the detailed operation of employee move or copy processing.
Figure 10:
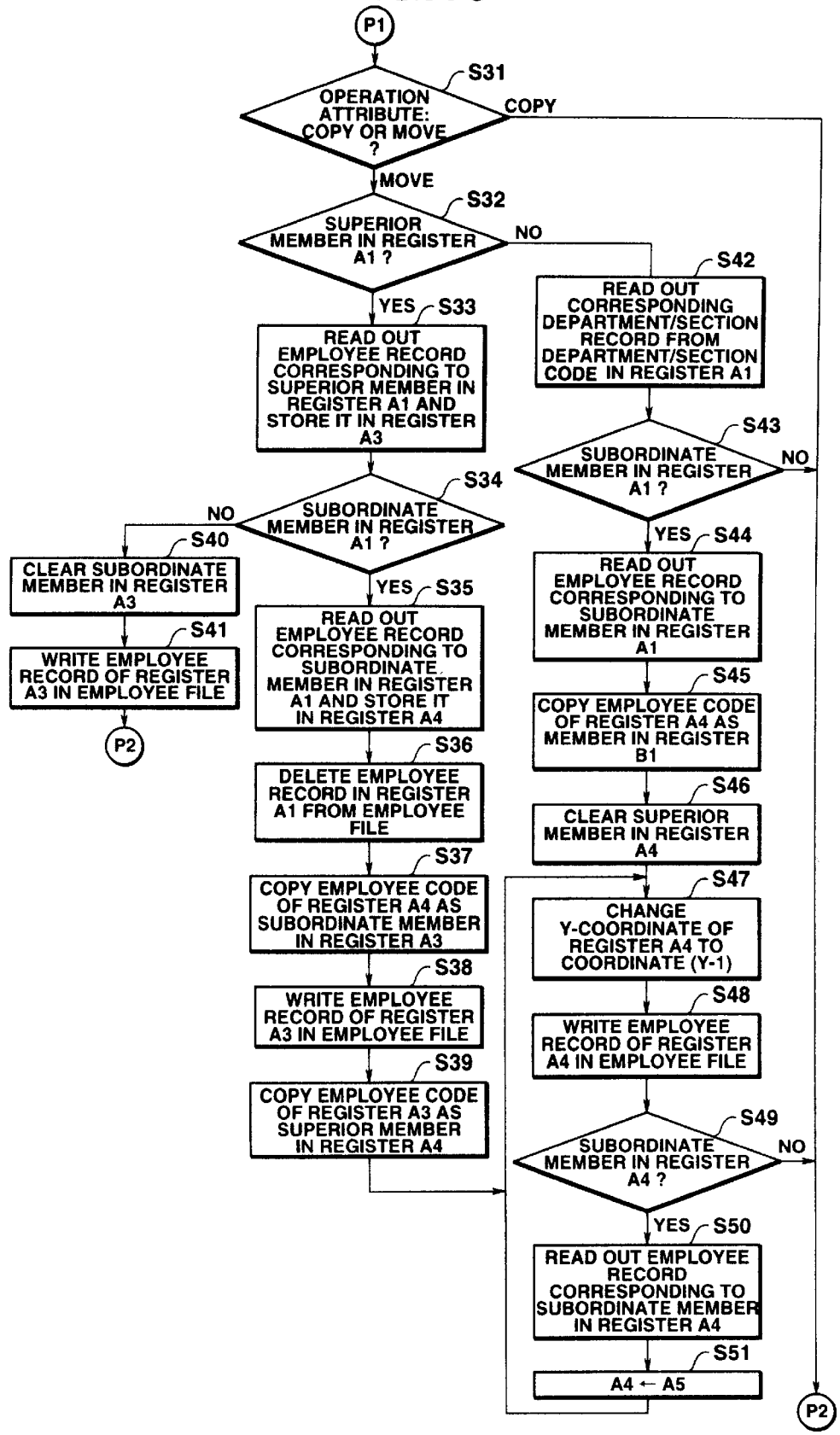
FIG. 10 is a flow chart (No. 2) for explaining the detailed operation of employee move or copy processing.

FIGS. 9 and 10 are views for explaining the above employee "move" or "copy" processing in detail.

Figure 8:
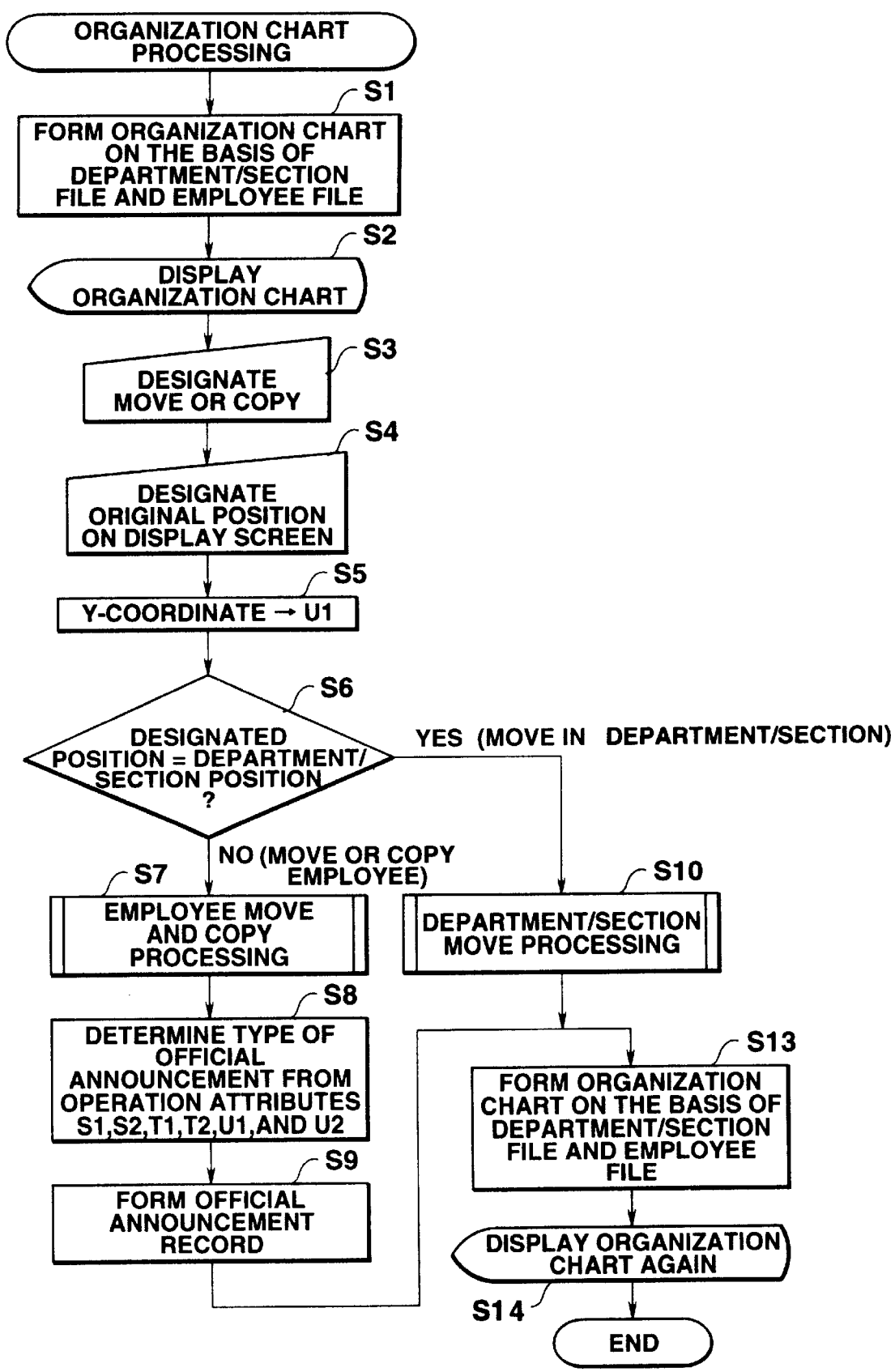
FIG. 8 is a flow chart for explaining the overall operation of editing processing of the organization chart.

In this processing, the items of "X-coordinates" and "Y-coordinates" of all the employee records 54r which are stored in the employee file 54 and located on the organization chart currently displayed on the screen of the display device 30 are retrieved using, as a key, the coordinates (X,Y) of the original position designated in step S4 in FIG. 8 (S21).

The employee record 54r having the coincident (X,Y) coordinates is read out from the employee file 54, and the contents of the readout data is stored in the register A (S22).

The department/section code of the top of the tree to which the employee record 54r belongs is retrieved, and the retrieved department/section code is stored in the register T1 (S23).

This retrieval is performed in a direction of higher departments/sections of the chain of department/section records 52r, starting from the department/section record 52r having the department/section code set in the item of "department/section code" of the employee record 54r.

Subsequently, the item of "department/section code" of the employee record 54r stored in the register A1 is stored in the register S1 (S24).

A message representing that "please designate the move or copy destination position (destination position)" is displayed on the screen of the display device 40.

In response to this message, the user designates the "move destination" or "copy destination" position (destination position) with clicking using a mouse through the input unit 20 (S25).

The (X,Y) coordinates of the destination position are received from the CPU 10, and the Y-coordinate is stored in the register U1 (S26).

The employee record 54r corresponding to these (X,Y) coordinates is retrieved on the basis of the (X,Y) coordinates of the destination position by looking up the employee file 54 (S27).

This employee record 54r is read out from the employee file 54 and stored in the register A2 (S28).

The department/section code of the top of the organization chart to which this employee record 54r belongs is retrieved, and the retrieved department/section code are stored in the register T2 (S29).

The item of "department/section code" of the employee record 54r stored in the register A2 is stored in the register S2 (S30).

It is then determined whether the operation attribute designated in step S3 of the flow chart in FIG. 8 is "move" or "copy" (S31).

If the operation attribute is determined as "move", the item of "superior member" of the employee record 54r stored in the register A1 is looked up to determine whether a superior member is present for the employee (target employee) corresponding to the employee record 54r (S32).

If YES in step S32, the employee record 54r of the superior member is read out from the employee file 54 and stored in the register A3 (S33).

The item of "subordinate member" of the employee record 54r of the target employee which is stored in the register A1 is looked up to determine whether the target employee has a subordinate member (S34).

If a subordinate member is present (YES in step S34), the employee record 54r stored in the register A1, i.e., the employee record 54r of the target employee is deleted from the employee file 54 (S35). The item of "employee code" of the employee record 54r stored in the register A4 is copied to the item of "subordinate member" of the employee record 54r which is stored in the register A1 (S37).

In the above processing, in the department/section to which the target employee belongs, the target employee is deleted. The employee record 54r of the subordinate member of the target employee which is stored in the register A3 and the employee record 54r of the superior member which is stored in the register A4 are directly linked by the item of "subordinate member" of the employee record 54r of the superior member.

The employee record 54r whose item of "subordinate member" is changed and which is stored in the register A3 is written in the employee file 54 (S38).

The updated employee record 54r of the superior member is written in the employee file 54.

The item of "employee code" of the employee record 54r stored in the register A3 is copied to the item of "superior member" of the employee record 54r stored in the register A4 (S39).

The employee record 54r of the superior member of the target employee and the employee record 54r of the subordinate member are directly linked by the item of "superior member" of the subordinate member.

The item of "Y-coordinate" of the employee record 54r stored in the register A4 is decremented by one (S47). The updated employee record 54r stored in the register A4 is written in the employee file 54 (S48).

The superior member and the subordinate member are directly linked in the personnel database 50.

On the other hand, if no subordinate member is present in step S34 (NO in step S34), the item of "subordinate member" stored in the register A3 is cleared (S40).

By moving the target employee, no subordinate member is present for the superior members of the target employee.

The employee record 54r stored in the register A3 is written in the employee file 54 (S41), and the flow, advances to step S52.

The updated employee record 54r of the superior member is written in the employee file 54. As a result, on the personnel database 50, only employees as the superior members of the target employee belong to the department/section to which the target employee belonged.

If no superior member of the target employee is present in step S32 (NO in step S32), the item of "department/section code" is read out from the employee record 54r stored in the register A1, and the readout employee record 54r is stored in the register B1 (S42).

The item of "subordinate member" of the employee record 54r stored in the register A1 is looked up to determine whether the subordinate member is present for the target member (S43).

If no subordinate member is present (NO in step S43), the flow advances to step S52. On the other hand, if a subordinate member is present (YES in step S43), the employee record 54r of the subordinate member having the employee code set in the item of "subordinate member" is read out from the employee file 54 and stored in the register A4 (S44).

The "employee code" of the employee record 54r stored in the register A4 is copied to the item of "member" of the department/section record 52r stored in the register B1 (S45).

The item of "superior member" of the employee record 54r stored in the register A4 is cleared (S46).

The item of "Y-coordinate" of the employee record 54r stored in the register A4 is decremented by one (S47). The updated employee record 54r stored in the register A4 is written in the employee file 54 (S48).

By the above processing, the employee who was the subordinate member of the target member is registered as the head of the department/section to which the target employee belonged.

The item of "subordinate member" of the employee record 54r is looked up to determine whether a subordinate member of an employee whose employee record 54r is stored in the register A4 is present (S49).

If the subordinate member is present (YES in step S49), the employee record 54r having the employee code set in the item of "subordinate member" is read out from the employee record 54r of the subordinate member.

This employee record 54r is the employee record 54r of the subordinate member. This employee record 54r is stored in the register A5 (S50).

The employee record 54r stored in the register A5 is copied to the register A4 (S51). Processing in steps S47 and 48 is executed again.

The item of "Y-coordinate" of the employee record 54r of the subordinate member of the target member is decremented by one. That is, in displaying the organization chart on the screen, the display position is moved upward by one line (the upper direction along the Y-axis.

Until it is determined in step S49 that no subordinate member is present (NO in step S49), processing in steps S47 to S51 is repeated. That is, processing for moving, upward, the display positions of all the employees located below the target employee is performed for the items of "Y-coordinates" of the employee records 54r of these employees.

When it is determined in step S49 that no subordinate member is present, the flow advances to step S52.

By the above processing, the target employee is deleted from the corresponding department/section on the personnel database 50. At the same time, the display positions of the employees as subordinate members of the target employee are moved upward by one line (the upper direction along the Y-axis).

As described above, the member constitution of the department/section to which the target member belonged is changed in the personnel database 50.

Processing from step S52 in the flow chart of FIG. 9 will be described below. If NO in steps S43 and S49, or if it is determined in step S31 that the designated operation attribute is "copy", the flow also advances to step S52.

Processing to be described below is processing for changing the member constitution of the "move" or "copy" destination of the target employee.

In step S52, it is determined with reference to the item of "superior member" of the employee record 54r whether a superior member of the employee whose employee record 54r is stored in the register A2 is present.

If no superior member is present (NO in step S52), the department/section record 52r having a department/section code set in the item of "department/section code" of the employee record 54r stored in the register A2 is read out, and the readout data is stored in the register B2 (S53).

The "employee code" of the employee record 54r stored in the register A1 is copied to the item of "member" of the department/section file 52r stored in the register B2 (S54).

The item of "superior member" of the employee record 54r stored in the register A1 is cleared (S55).

By the above processing, the employee (target employee) who is subjected to "move" or "copy" processing and whose employee record 54r is stored in the register A1 is set as the head of the destination department/section of "personnel change" or "holding of additional post".

On the other hand, if a superior member is present in step S52 (YES in step S52), the contents of the item of "superior member" of the employee record 54r stored in the register A2 are copied to the item of "superior member" of the employee record 54r stored in the register A1 (S56).

In the destination department/section of "personnel change" or "holding of additional post", the target employee is set as the subordinate member of the employee whose employee record 54r is stored in the register A2.

After processing in step S55 or S56, the contents of the item of "department/section code" of the employee record 54r stored in the register A2 are copied to the item of "department code" of the employee record 54r stored in the register A1 (S57).

The contents of the items of "X-coordinate" and "Y-coordinate" 1 of the employee record 54r stored in the register A2 are copied to the items of "X-coordinate" and "Y-coordinate" of the employee record 54r stored in the register A1 (S58).

The employee record 54r of the target employee which has the updated contents stored in the register A1 is written in the employee file 54 (S59).

The department/section record 52r stored in the register B2 is then written in the department/section file 52 (S60).

By the above processing, the post of the target employee in the destination department/section of "personnel change" or "holding of additional post" is registered on the personnel database 50.

The item of "Y-coordinate" of the employee record 54r stored in the register A2 is incremented (S61).

The updated employee record 54r stored in the register A2 is written in the employee file 54 (S62).

The employee whose employee record 54r is stored in the register A2 is registered as the subordinate member of the target employee on the organization chart in the personnel database 50.

It is then determined whether an employee code is set in the item of "subordinate member" of the employee record 54r stored in the register A2, i.e., whether a subordinate member is present for the employee whose employee record 54r is stored in the register A2 (S63).

If the subordinate member is present (YES in step S63), the employee record 54r of the employee having the employee code set in the item of "subordinate member" is read out from the employee file 54. This employee record 54r is stored in the register A5 (S64).

The employee record 54r stored in the register A5 is stored in the register A2 (S65), and the flow returns to step S61.

Subsequently, processing in steps S61 and S62 is executed for the employee record 54r newly stored in the register A2. In step S63, it is determined again whether the department/section code is set in the item of "subordinate member" of the employee record 54r stored in the register A2. If no department/section code is set (NO in step S63), processing is ended.

As described above, registration is performed in the personnel database 50 such that the display position of the employee who becomes the subordinate member of the target employee on the organization chart is lowered by one line in the department/section to which the "move" or "copy" target employee newly belongs.

When the organization charts shown in FIGS. 3A and 3B are taken as an example, the display positions of "Jiro Takahashi" and "Goro Kobayashi" in the "employment section" as the personnel change destination of "Kyoko Yamamoto" are lowered by one line.

A description will be made with reference to the flow chart in FIG. 8 again.

When the employee move or copy processing in step S7 of the flow chart in FIGS. 9 and 10 is completed, the types of official announcements for all the employees subjected to official announcement targets upon the personnel change of the target employee are determined with reference to the official announcement type information table 100 on the basis of the contents stored in the registers S1, S2, T1, T2, U1, and U2 and the types (move or copy) of operations (S8).

The type of official announcement is determined by a combination of "operation attribute" (move or copy), "change in top of tree", and "change in employee department/section code".

The "change in top of tree" is determined by checking the department/section codes set in the registers T1 and T2. The "change in employee department/section code" is determined by checking the department/section codes set in the registers S1 and S2. The "operation attribute" is determined by an operation designated by the user in step S3.

The following "types of official announcements" are determined with reference to the official announcement type information table 100.

Personnel Change: the "operation attribute" is "move", the "change in top of tree" is "home company home company", and the "change in employee department/section code" is "change".

Personnel Change (Promotion): in addition to the "personnel change" condition, a condition that the "Y-coordinate is changed" is added.

Temporary Transfer: the "operation attribute" is "move", the "change in top of tree" is "home company another company", and the "change in employee department/section code" is "change".

Return from Temporal Transfer: the "operation attribute" is "move", the "change in top of tree" is "another company home company", and the "change in employee department/section code" is "change".

Holding of Additional Post: the "operation attribute" is "copy", the "change in top of tree" is "home company home company" and the "change in employee department/section code" is "change".

Promotion: the "operation attribute" is "move", the "change in top of tree" is "home company home company", the "change in employee department/section code" is "change", and the "Y-coordinate is increased".

Demotion: the "operation attribute" is "move", the "change in top of tree" is "home company home company", the "change in employee department/section code" is "change", and the "Y-coordinate is decreased".

As described above, after the "type of official announcement" is determined, an official announcement record having the format shown in FIG. 2C is formed and written in the official announcement history file 56 (S9).

The department/section record 52r and the employee record 54r are read out from the department/section file 52 and the employee file 54 which are updated by the above processing. A new organization chart is then formed (S13).

The above organization chart is displayed on the screen of the display device 30 (S14).

By the above processing, in the organization chart (FIG. 3A) on the screen of the display device 30, an operation for "moving" "Kyoko Yamamoto" from the "personnel section" to a position above "Jiro Takahashi" of the "employment section", the display of the organization chart is changed, as shown in FIG. 3B.

On the other hand, when the position designated in step S6 is determined as the position of "department/section display" (YES in step S6), department/section move processing is executed (S10), and a detailed description thereof will be omitted.

Although not shown in the flow chart, when the user inputs a command or the like from the input unit 20 to designate the printout of the written official announcement, the official announcement record 56r written in the official announcement history file 56 is read out, and the written official announcement is output through the printer 40.

As described above, according to this embodiment, the organization chart can be easily changed on the screen using a pointing device such as a mouse. In addition, the change can be immediately reflected on the employee file 54 and the department/section file 52 which constitute the personnel database 50. With a change of the organization chart, the official announcement record for a target employee subjected to the personnel changes can be automatically formed, and the official announcement record is stored in the official announcement history file 56. The written official announcement can be printed out through the printer 40 on the basis of the official announcement record stored in the official announcement history file 56.

The operations such as organization changes or personnel changes can be quickly and accurately performed on the screen.

Note that the "move" and "copy" can be executed as the operations on the organization chart in the above embodiment. Other operations such as "delete" may be added. Alternatively, the organization chart before the change is left, and the changed organization chart may be displayed in a color different from that of the organization chart before the change, thereby recognizing a change on the screen.

The second embodiment will be described below.

FIG. 11 is a block diagram showing the main part of a computer system 1.

Referring to FIG. 11, the computer system 1 comprises a CPU (Central Processing Unit) 2, a key input unit 3, a pointing device 4, a ROM (Read-Only Memory) 5, a RAM (Random Access Memory) 6, a collation processing controller 7, an organization chart forming processor 8, a file memory 9, an image memory 13, a printer 11, and a display unit 12. These components are connected to each other through a bus 15.

The CPU 2 controls the respective components to execute various information processing operations in accordance with the various control programs stored in the ROM 5. The processing processes and the processing results are displayed on the display unit 11.

In collation processing to be described later, the CPU 2 causes the organization chart forming processor 8 to execute hierarchical table formation processing and hierarchical image development processing, to form a hierarchical table on the basis of various data associated with the organization and stored in a department/section table file 9a and an employee master file 9b in the file memory 9, and to develop the formed hierarchical table, thereby displaying the chart on the display unit 12. The CPU 2 causes the collation processing controller 7 to read out, from a photograph-of-face file 9c or the employee master file 9b, face image or personal information of an employee whose position is designated with the pointing device 4, thereby displaying the data on organization chart. The CPU 2 also causes the collation processing controller 7 to specify the target retrieval range in accordance with end position designation with the pointing device 4, to retrieve data matching an input retrieval condition within the target retrieval range in the employee master file 9b, and to change the display color of the corresponding employee on the organization chart on the basis of the retrieval result.

The key input unit 3 has cursor keys, numerical input keys, and various function keys and outputs a key depression signal of a depressed key to the CPU 2. The pointing device 4 is a pointing device as an auxiliary device of the key input unit 3 and outputs an operation signal to the CPU 2.

The ROM 5 stores various control programs executed by the CPU 2. The ROM 5 also stores a collation processing program, and hierarchical table formation processing and hierarchical image development processing programs which are executed by the organization chart forming processor 8 in collation processing. The RAM 6 forms a memory area for developing various data in executing the above various processing programs by the CPU 2.

In collation processing executed by the CPU 2, the collation processing controller 7 reads out face image or personal information from the photograph-of-face file 9c or the employee master file 9b in accordance with the display position designation with the pointing device 4, displays the readout information on the organization chart, specifies the target retrieval range in accordance with the end position designation with the pointing device 4, retrieves data corresponding to a retrieval condition input within the target retrieval range in the employee master file 9b, and controls to change the display color of the corresponding employee on the organization chart on the basis of the retrieval result.

In collation processing executed by the CPU 2, the organization chart forming processor 8 executes hierarchical table formation processing and hierarchical image development processing (both will be described later) to form a hierarchical table on the basis of the various data associated with the organization and stored in the department/section table file 9a and the employee master file 9b in the file memory 9, stores the formed hierarchical table in the hierarchical table memory 8a, develops the hierarchical table image data in the image memory 13 using a hierarchical level counter 8a on the basis of the hierarchical table stored in the hierarchical table memory 8b, and displays the developed organization's hierarchical table image on the display unit 12.

The file memory 9 stores the department/section table file 9a, the employee master file 9b, and the photograph-of-face file 9c, as shown in FIG. 11. The department/section table file 9a is a table for storing various information associated with a department/section as a constituent element of the organization in association with the hierarchical structure of the organization, as shown in FIG. 12. The department/section table file 9a stores a department/section code, the name of department/section, a higher department/section code (i.e., the code of a higher department/section to which the given department/section belongs), a hierarchical number (representing the hierarchical position), and an employee number representing an employee as the department/section manager. The employee master file 9b is a master file for storing various information associated with an employee of a department/section in association with the department/section code of the department/section table file 9a, as shown in FIG. 13. The employee master file 9b stores an employee number, and the name of employee, and a department/section code. The employee master file 9b also stores a post, the year of employment, an age, and a family as personal information. The photograph-of-face file 9c stores photograph-of-face data in correspondence with the employee numbers stored in the employee master file 9b.

The image memory 13 forms the memory area for developing image data of the organization processing chart, formed by the organization chart forming processor 8, in units of blocks for each department/section. The printer 11 prints and outputs print data, input from the CPU 2, on predetermined recording paper. The display unit 12 comprises a CRT (Cathode-Ray Tube) or the like and displays the display data input from the CPU 2.

The operation of this embodiment will be described below.

Collation processing executed by the computer system 1 of this embodiment will be described with reference to a flow chart in FIG. 14.

Figure 14:
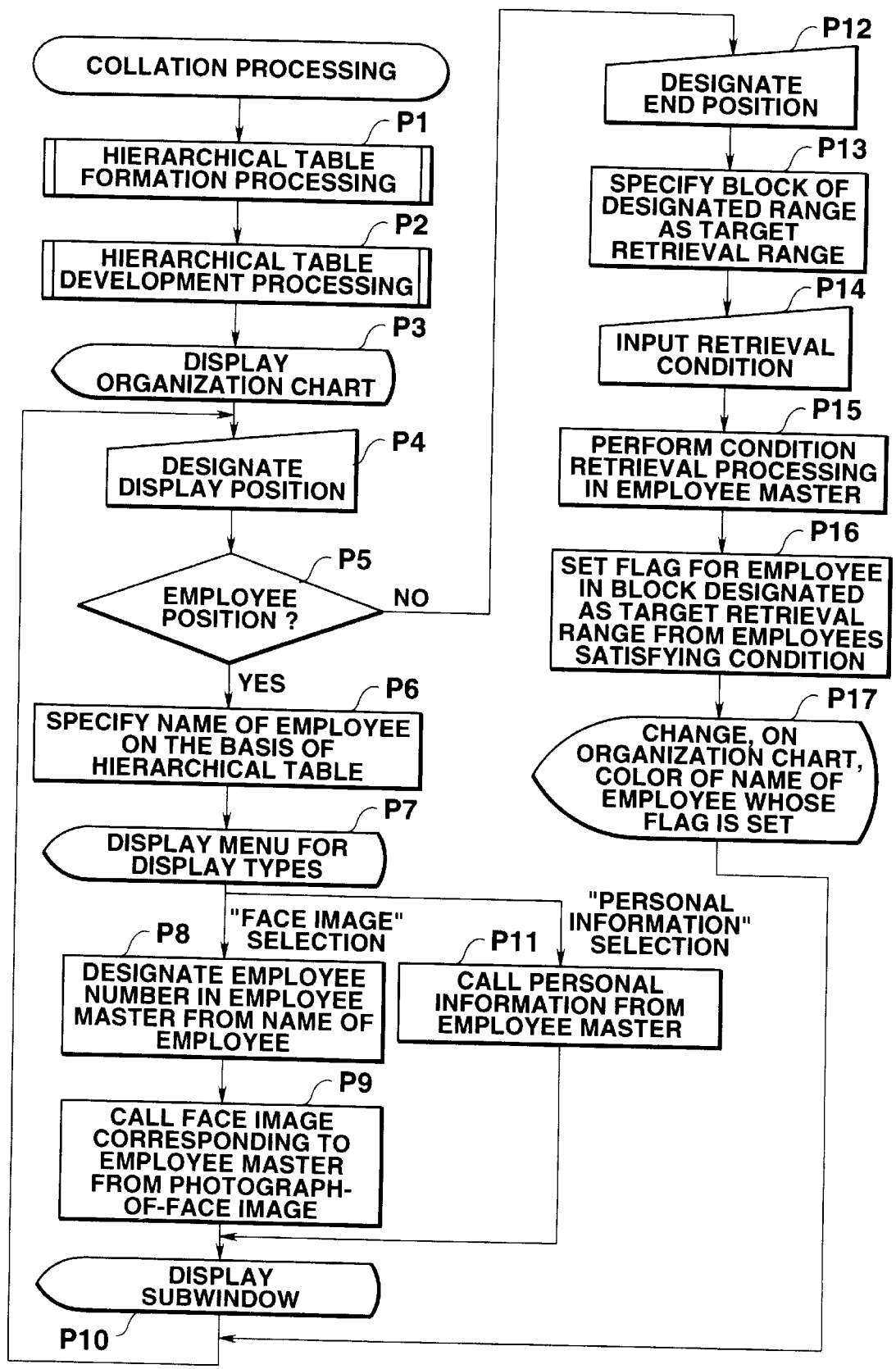
FIG. 14 is a flow chart of collation processing executed by the computer system of this embodiment.
Figure 15:
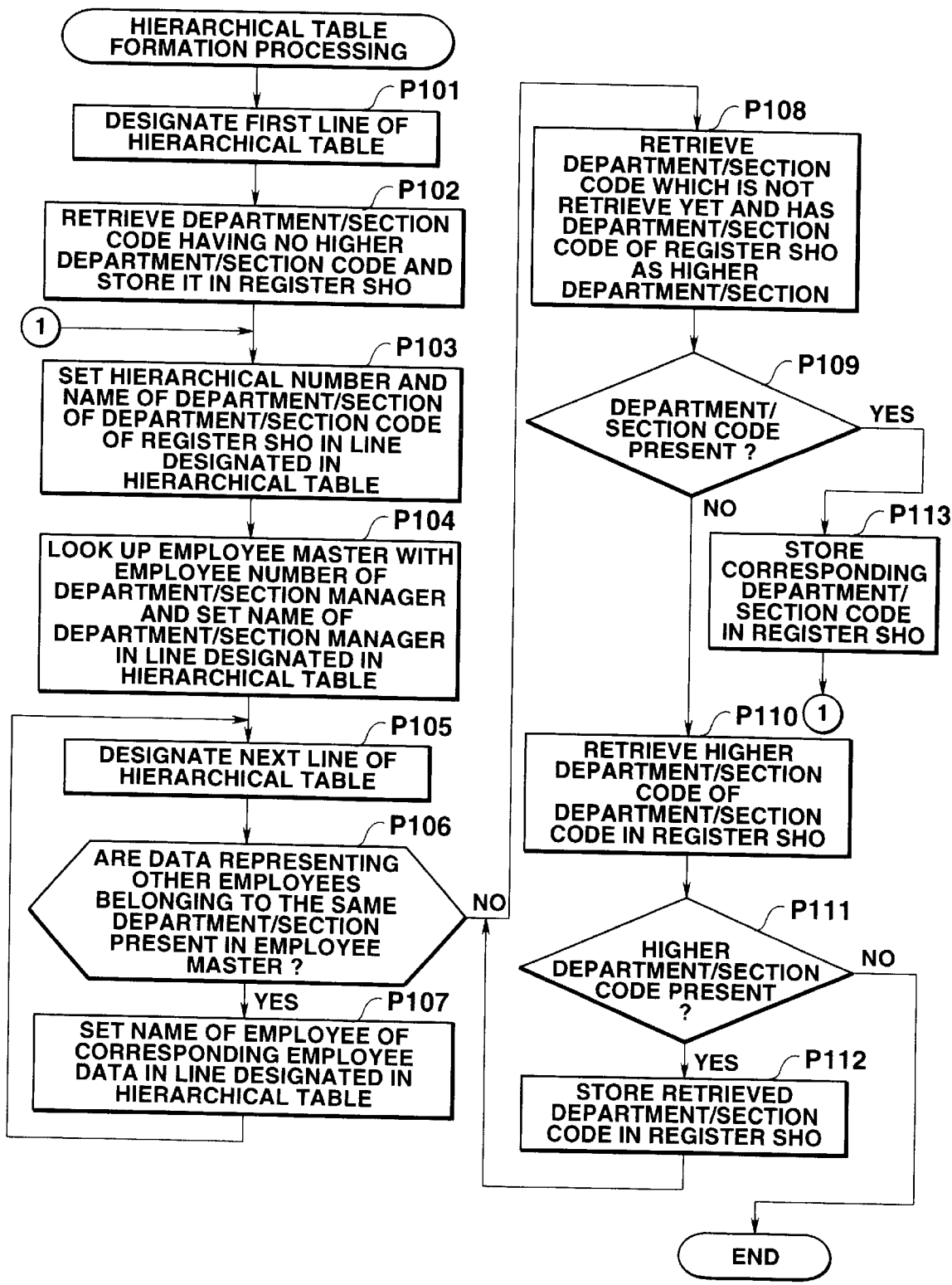
FIG. 15 is a flow chart of hierarchical table formation processing executed in the collation processing of FIG. 14 by an organization chart forming processor in FIG. 11.

Referring to FIG. 14, when collation processing is started, the organization chart forming processor 8 executes hierarchical table formation processing on the basis of various data associated with the organization and stored in the department/section table file 9a and the employee master file 9b of the file memory 9 (step P1). This hierarchical table formation processing will be described with reference to a flow chart shown in FIG. 15.

The first line of the hierarchical table (FIG. 16) to be developed in the hierarchical table memory 8a is designated (step P101), and a department/section code having no higher department/section code is retrieved from the department/section table shown in FIG. 12. The retrieved department/section code is stored in a register SHO in the RAM 6 (step P102). In the department/section table file 9a in FIG. 12, a department/section code of 100 corresponds to that having no higher department/section code. Therefore, this department/section code of 100 is stored in the register SHO.

The hierarchical number "1" and the name of department/section "timepiece operation department" of the department/section code of 100 stored in the register SHO are read out from the department/section table file 9a. The readout data are set in the first line of the hierarchical table (FIG. 16) which is designated in step S101 (step P103). The employee master file 9b shown in FIG. 13 is looked up on the basis of the corresponding department/section manager number of 0100 of the department/section table master 9a, and the department/section manager name "A" is set in the first line designated in a hierarchial table in FIG. 16 (step P104).

The second line as the next line in the hierarchical table in FIG. 16 is designated (step P105) to check whether employee data of employees belonging to the same department/section are present in the employee master file 9b (step P106). If YES in step P106, the names of employees of the corresponding employee data are read out from the employee master file 9b and set in the second line of the hierarchical table which is designated in step P105 (step P107). The flow then returns to step P105.

If no employee data of employees belong to the same department/section are present, the following operations are performed. Since no employee data of employees having the same department/section code of 100 are present in the employee master file 9b in FIG. 13, a non-retrieved department/section code having the department/section code of 100, stored in the register SHO of the RAM 6 in step P102, as the higher department/section is retrieved (step P108). It is then determined in accordance with this retrieval result whether the corresponding department/section code is present (step P109). If NO in step P109, the higher department/section code of the department/section code of 100 stored in the register SHO of the RAM 6 is retrieved from the department/section table file 9a (step P110). It is then determined in accordance with this retrieval result whether the corresponding department/section code is present (step P111).

If no corresponding department/section code is present, this processing is ended. However, if the corresponding department/section code is present, the retrieved department/section code is stored in the register SHO in the RAM 6 (step P112). The flow then returns to step P108.

If the corresponding department/section code is present in step P109, i.e., since the department/section code of 110 having the department/section code of 100 as the higher department/section code is present in the second line in the department/section table file 9a in FIG. 12, this corresponding department/section code of 110 is stored in the register SHO in the RAM 6 (step P113). The flow then returns to step P103.

In step P103, the hierarchical number "2" and the name of department/section "development department" of the department/section code of 110 stored in the register SHO in step P113 are read out from the department/section table file 9a. The readout data are set in the second line of the hierarchical table (FIG. 16) designated in step P105. The employee master file 9b in FIG. 13 is looked up on the basis of the corresponding department/section manager number of 0501 in the department/section table file 9a, and the department/section manager name "B" is set in the second line as the designated line in the hierarchical table (step P104). As a result, the data is developed in the second line of the hierarchical table in FIG. 16.

The third line as the next line in the hierarchical table in FIG. 16 is designated (step P105) to check if the employee data of employees belonging to the same department/section 110 are present in the employee master file 9b (step P106). Since no other employee data of employees belonging to the same department/section 110 are present in the employee master file 9b in FIG. 11, a non-retrieved department/section code having, as the higher department/section, the department/section code of 110 stored in the register SHO in the RAM 6 in step P113 is retrieved from the department table file 9a (step P108). It is then determined in accordance with this retrieval result whether the corresponding department/section code is present (step P109).

Since the department/section code of 111 having the department/section code of 110 as the higher department/section code is present in the department/section table file 9a in FIG. 12, the department/section code of 111 is stored in the register SHO in the RAM 6 (step P113), and the flow returns to step P103. In step P103, the hierarchical number "3" and the name of department/section "development section" of the department/section code of 111 stored in the register SHO in step P113 are read out from the department/section table file 9a. The readout data are set in the third line of the hierarchical table (FIG. 16) which is designated in step P105. The employee master file 9b in FIG. 13 is looked up on the basis of the corresponding department/section manager number of 1201 of the department/section table file 9a, and the department/section manager name "E" is set in the third line as the designated line of the hierarchical table in FIG. 16 (step P104). As a result, the data is developed as shown in the third line of the hierarchical table in FIG. 16.

The fourth line as the next line in the hierarchical table in FIG. 16 is designated (step P105) to check whether other employee data of employees belonging to the same department/section are present in the employee master file 9b (step P106). Since the employee number of 2501 as the employee data of the same department/section 111 is present in the employee master file 9b in FIG. 13, the name "I" of this employee data is set in the fourth line of the hierarchical table in FIG. 16 (step P107). The flow returns to step P105.

In step P105, the fifth line as the next line in the hierarchical table in FIG. 16 is designated to check if any other employee data of an employee belonging to the same department/section is present in the employee master file 9b (step P106). Since the employee number of 2502 as the employee data of the same department/section 111 is present in the employee master file 9b in FIG. 13. The name "J" of this employee data is set in the fifth line of the hierarchical table in FIG. 16 (step P107), and the flow returns to step P105.

In step P105, the sixth line as the next line in the hierarchical table in FIG. 16 is designated to check if any other employee data of an employee belonging to the same department/section is present in the employee master file 9b (step P106). Since no employee number except for the employee numbers of 2501 and 2502 is present as the employee data of the employee belonging to the same department/section code of 111 in the employee master file 9b in FIG. 13, a non-retrieved department/section code having, as the higher department/section, the department/section code of 111 stored in the register SHO in the RAM 6 is retrieved from the department/section table file 9a (step P108). It is then determined in accordance with this retrieval result whether the corresponding department/section code is present (step P109).

Since no department/section code having the department/section code of 111 as the higher department/section is present in the department/section table file 9a in FIG. 12, the higher department/section code of the department/section code of 111 stored in the register SHO is retrieved from the department/section table file 9a (step P110). It is then determined in accordance with this retrieval result whether the corresponding department/section code is present (step P111). Since the department/section code of 110 is present as the higher department/section code of the department/section code of 111, this department/section code of 110 is stored in the register SHO (step P112), and the flow returns to step P108.

Processing in steps P108 to P112 is repeated to store the department/section code of 100 in the register SHO. The department/section code of 120 is retrieved from the department/section table file 9a (FIG. 12) as the non-retrieved department/section code having the department/section code of 100 as the higher department/section code. The department/section code of 120 is stored in the register SHO, and the flow returns to step P103.

Steps P103 to P107 are repeatedly performed to develop the higher hierarchical level "1", the name of department/section "design department", the name of department/section manager "C", and the name of department/section member "K" as the data associated with the department/section code of 120 in the seventh and eighth lines of the hierarchical table in FIG. 16.

Steps P103 to P113 are repeatedly executed to develop the data from the ninth line of the hierarchical table in FIG. 16 on the basis of the department/section table file 9a in FIG. 12 and the employee master file 9b in FIG. 13, thereby completing hierarchical table formation processing.

When this hierarchical table formation processing is completed, the flow advances to hierarchical image development processing in steps P1 and P2.

Figure 17:
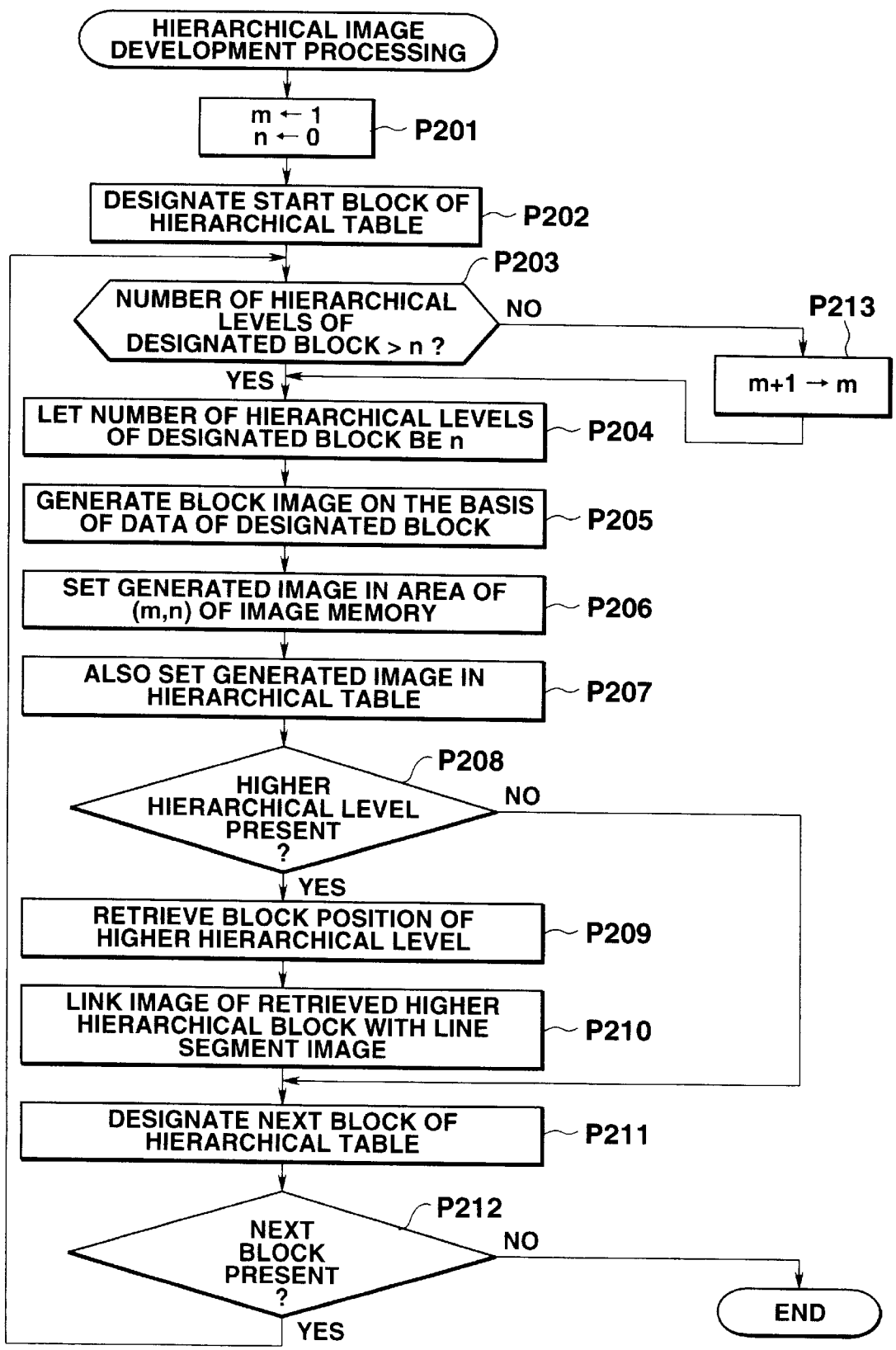
FIG. 17 is a flow chart of hierarchical image development processing executed in organization chart display processing in FIG. 14 by the organization chart forming processor in FIG. 11.

The hierarchical image development processing executed by this organization chart forming processor 7 will be described with reference to a flow chart in FIG. 17.

"1" is set in a horizontal counter m of the hierarchical level counter 8b used to set a position where a hierarchical image is to be developed, and "0" is set in a vertical counter n (step P201). The start block of the hierarchical table in FIG. 16 is designated (step P202) to determine whether the hierarchial number of the designated block is larger than the value set in the vertical counter n (step P203).

Figure 18:
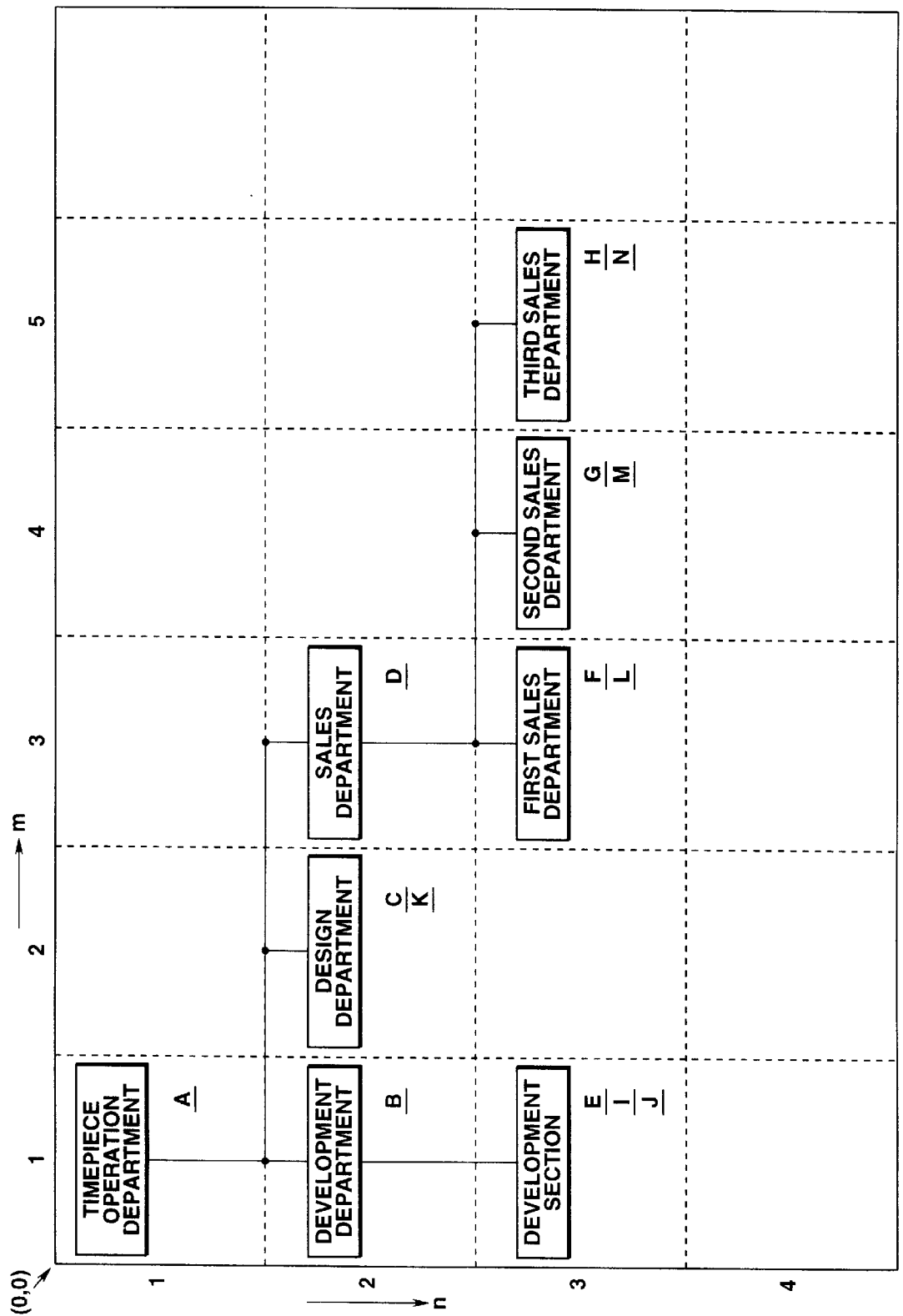
FIG. 18 is a chart showing the block image of the hierarchical table developed in an image memory in FIG. 11 by the hierarchical image development processing in FIG. 17.

In this case, the hierarchical number of the start block of the hierarchical table in FIG. 16 is "1", which is larger than the value "0" 1 of the vertical counter n which is set in step P201. The hierarchical number "1" of the designated start block is set in the vertical counter n (step P204). A block image is generated on the basis of data (the name of department: timepiece operation department; the name of department manager: A) developed in the block corresponding to the designated hierarchical number "1" of the hierarchial table in FIG. 16 (step P205). The block image generated from the block having the hierarchical number "1" is set at the development block position of coordinates (1,1) in the hierarchical image development area in the image memory 13, as shown in FIG. 18 (step P206). The position information (position number and line) of the generated block image is also set in the hierarchical table memory 8a (step P207).

Figure 19:
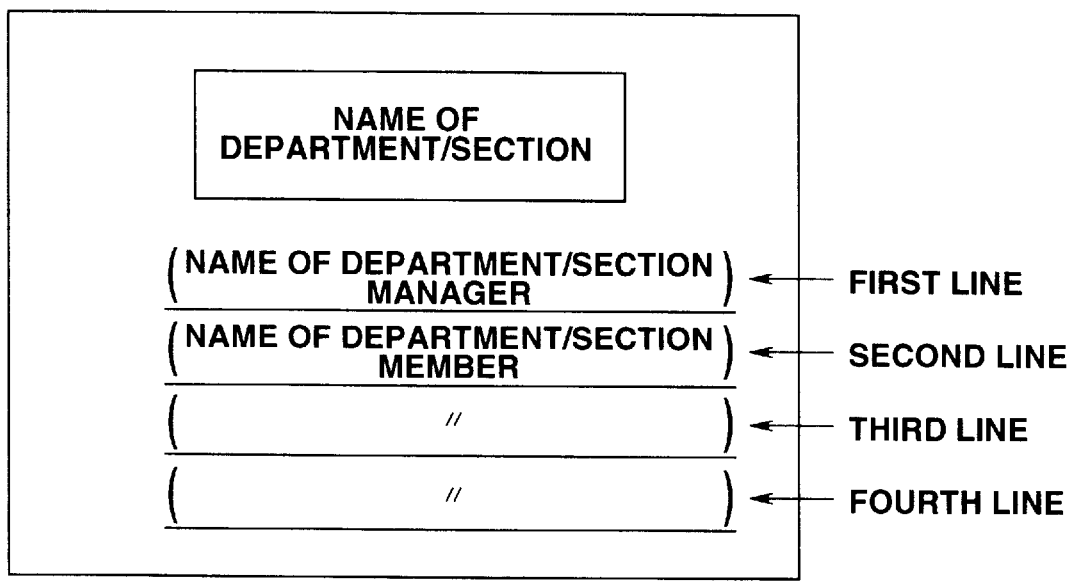
FIG. 19 is a view showing hierarchical data of a hierarchical image development area (FIG. 18) which is developed in units of blocks.

The hierarchical image development area of the image memory 13 shown in FIG. 18 forms a hierarchical table data development area in units of blocks represented by coordinates (m,n) corresponding to the counts of the vertical counter m and the horizontal counter n in the hierarchical level counter 8b. As shown in FIG. 19, each block is arranged to develop the name of department/section, and four-line data (the first line: the name of department/section manager; the second to fourth lines: the names of constituent members) below the name of department/section.

Data delimited in units of blocks with the hierarchical numbers of the hierarchical table in FIG. 16 are developed in the hierarchical table data development area (FIG. 18) in units of blocks.

It is checked if the higher hierarchical level data is set in the start block delimited by the designated hierarchical number "1" of the hierarchical table in FIG. 16 (step P208). Since no higher hierarchical level data is set in this start block, the flow advances to step P211. A block having a hierarchical number next to that of the start block of the hierarchical table in FIG. 16 is designated to determine whether the next block is present (step P211). Since a block delimited by the hierarchical number "2" next to the start block is present, the flow returns to step P203.

Since the hierarchical number "2" of the designated next block is larger than the value "1" set in the vertical counter n in step P204, the hierarchical number "2" of the designated block is set in the vertical counter n (step P204). A block image is generated on the basis of data (the name of department: timepiece operation department; the name of department manager: B) developed in the block corresponding to the designated hierarchical number "2" of the hierarchial table in FIG. 16 (step P205). The block image generated from the block having the hierarchical number "2" is set at the development block position of coordinates (1,2) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "2" of the hierarchical table in FIG. 16 (step P208). Since "1" is set as the higher hierarchical level data is set in the block having the hierarchical number "2" in FIG. 16, the block position corresponding to the higher hierarchical level having the number "1" is retrieved within the hierarchical image in FIG. 18 (step P209). The retrieved image of the higher hierarchical block is coupled to the block image with a line segment image, as shown in FIG. 18 (step P210).

A block next to the block having the hierarchical number "2" in the hierarchical table in FIG. 16 is designated (step P211) to determine whether the next block is present (step P212). Since a block delimited by a hierarchical number "3" is present in the hierarchical table in FIG. 16, the flow returns to step P203.

Since the hierarchical number "3" of the designated next block is larger than the value "2" set in the vertical counter n in step P204, the hierarchical number "3" of the designated block is set in the vertical counter n (step P204). A block image is generated on the basis of data (the name of section: development section; the name of section manager: E; the names of members: I, J) developed in the block corresponding to the designated hierarchical number "3" of the hierarchial table in FIG. 16 (step P205). The block image generated from the block having the hierarchical number "3" is set at the development block position of coordinates (1,3) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "3" of the hierarchical table in FIG. 16 (step P208). Since "2" is set as the higher hierarchical level data is set in the block having the hierarchical number "3" in FIG. 16, the block position corresponding to the higher hierarchical level having the number "2" is retrieved within the hierarchical image in FIG. 18 (step P209). The retrieved image of the higher hierarchical block is coupled to the block image with a line segment image, as shown in FIG. 18 (step P210).

A block next to the block having the hierarchical number "3" in the hierarchical table in FIG. 16 is designated (step P211) to determine whether the next block is present (step P212). Since a block delimited by a hierarchical number "2" is present in the hierarchical table in FIG. 16, the flow returns to step P203.

Since the hierarchical number "2" of the designated next block is smaller than the value "3" set in the vertical counter n in step P204, the horizontal counter m is counted up to m=2 (m+1→m) (step P213). The hierarchial number "2" of the designated block is set in the vertical counter n (step P204). A block image is generated on the basis of data (the name of department: design department; the name of depart-
ment manager: C; the name of member: K) developed in the block corresponding to the designated hierarchical number "2", of the hierarchial table in FIG. 16 (step P205). The block image generated from the block having the hierarchical number "2" is set at the development block position of coordinates (2,2) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "2", of the hierarchical table in FIG. 16 (step P208). Since "1" is set as the higher hierarchical level data is set in the block having the hierarchical number "2" in FIG. 16, the block position corresponding to the higher hierarchical level having the number "1" is retrieved within the hierarchical image in FIG. 18 (step P209). The retrieved image of the higher hierarchical block is coupled to the block image with a line segment image, as shown in FIG. 18 (step P210).

A block next to the block having the hierarchical number "2" in the hierarchical table in FIG. 16 is designated (step P211) to determine whether the next block is present (step P212). Since a block delimited by a hierarchical number "2" is present in the hierarchical table in FIG. 16, the flow returns to step P203.

Since the hierarchical number "2" of the designated next block is equal to the value "2" set in the vertical counter n in step P204, the horizontal counter m is counted up to m=3 (m+1→m) (step P212). The hierarchial number "2" of the designated block is set in the vertical counter n (step P204). A block image is generated on the basis of data (the name of department: sales department; the name of department manager: D) developed in the block corresponding to the designated hierarchical number "2" of the hierarchial table in FIG. 16 (step P205). The block image generated from the block having the hierarchical number "2" is set at the development block position of coordinates (3,2) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "2" of the hierarchical table in FIG. 16 (step P208). Since "1" is set as the higher hierarchical level data is set in the block having the hierarchical number "2" in FIG. 16, the block position corresponding to the higher hierarchical level having the number "1" is retrieved within the hierarchical image in FIG. 18 (step P209). The retrieved image of the higher hierarchical block is coupled to the block image with a line segment image, as shown in FIG. 18 (step P210).

A block next to the block having the hierarchical number "2" in the hierarchical table in FIG. 16 is designated (step P211) to determine whether the next block is present (step P212). Since a block delimited by a hierarchical number "3" is present in the hierarchical table in FIG. 16, the flow returns to step P203.

Since the hierarchical number "3" of the designated next block is larger than the value "2" set in the vertical counter n in step P204, "3" is set in the vertical counter n (step P204). A block image is generated on the basis of data (the name of section: first sales section; the name of section manager: F; the name of member: L) developed in the block corresponding to the designated hierarchical number "3" of the hierarchial table in FIG. 16 (step P205). The block image generated from the block having the hierarchical number "3" is set at the development block position of coordinates (3,3) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "3" of the hierarchical table in FIG. 16 (step P208). Since "2" is set as the higher hierarchical level data is set in the block having the hierarchical number "3" in FIG. 16, the block position corresponding to the higher hierarchical level having the number "2" is retrieved within the hierarchical image in FIG. 18 (step P209). The retrieved image of the higher hierarchical block having the hierarchical number "3" is coupled to the block image with a line segment image, as shown in FIG. 18 (step P210).

A block next to the block having the hierarchical number "3" in the hierarchical table in FIG. 16 is designated (step P211) to determine whether the next block is present (step P212). Since a block delimited by a hierarchical number "3" is present in the hierarchical table in FIG. 16, the flow returns to step P203.

Since the hierarchical number "3" of the designated next block is equal to the value "3" set in the vertical counter n in step P204, the horizontal counter m is counted up to m=4 (m+1→m) (step P213), and the hierarchical number "3" of the designated block is set in the vertical counter n (step P204). A block image is generated on the basis of data (the name of section: second sales section; the name of section manager: G; the name of member: M) developed in the block corresponding to the designated hierarchical number "3" of the hierarchial table in FIG. 16 (step P205). The block image generated from the block having the hierarchical number "3" is set at the development block position of coordinates (4,3) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "3" of the hierarchical table in FIG. 16 (step P208). Since "2" is set as the higher hierarchical level data is set in the block having the hierarchical number "3" 1 in FIG. 16, the block position corresponding to the higher hierarchical level having the number "2" is retrieved within the hierarchical image in FIG. 18 (step P209). The retrieved image of the higher hierarchical block is coupled to the block image with a line segment image, as shown in FIG. 18 (step P210).

A block next to the block having the hierarchical number "3" in the hierarchical table in FIG. 16 is designated (step P211) to determine whether the next block is present (step P212). Since a block delimited by a hierarchical number "3" is present in the hierarchical table in FIG. 16, the flow returns to step P203.

Since the hierarchical number "3" of the designated next block is equal to the value "3" set in the vertical counter n in step P204, the horizontal counter m is counted up to m=5 (m+1→m) (step P213). The hierarchial number "3" of the designated block is set in the vertical counter n (step P204). At block image is generated on the basis of data (the name of section: third sales section; the name of section manager: H; the name of member: N) developed in the block corresponding to the designated hierarchical number "3" of the hierarchial table in FIG. 16 (step P205). The block image generated from the block having the hierarchical number "3" is set at the development block position of coordinates (5,3) in the hierarchical image development area in the image memory 13, as shown in FIG. 18 (step P206). The position information (position number and line) of the generated block image is also set in the hierarchical table memory 8a (step P207).

It is then checked if higher hierarchical level data is set in the designated block having the hierarchical number "3" of the hierarchical table in FIG. 16 (step P208). Since "2" is set as the higher hierarchical level data is set in the block having the hierarchical number "3" in FIG. 16, the block position corresponding to the higher hierarchical level having the number "2" is retrieved within the hierarchical image in FIG. 18 (step P209). The retrieved image of the higher hierarchical block is coupled to the block image with a line segment image, as shown in FIG. 18 (step P210).

A block next to the block having the hierarchical number "3" in the hierarchical table in FIG. 16 is designated (step P211) to determine whether the next block is present (step P212). Since no block is present in the hierarchical table in FIG. 16, hierarchical image development processing shown in FIG. 14 is ended.

In step P3 of FIG. 14, the organization's hierarchical image data developed in the image memory 13 by the hierarchical image development processing is displayed on the display unit 11, and the display position designation on the organization's hierarchical image with the pointing device 4 is confirmed (step P4). It is determined whether this display position designation indicates an employee position (step P5). If YES in step P5, the name of employee stored in the hierarchical table memory 8a in association with the position information corresponding to this employee position is specified (step P6). A menu for selecting the type of information (face image or personal image) for displaying the contents of the designated employee is displayed on the organization's hierarchical image displayed on the display unit 12 (step P7).

Figure 20:
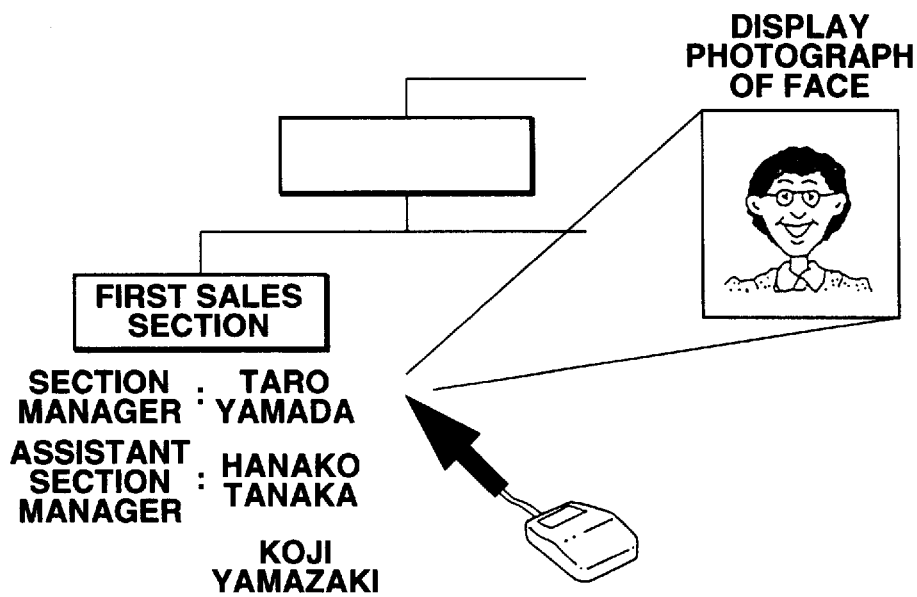
FIG. 20 is a view showing a display example when the employee position of a hierarchical image in the organization is designated in the collation processing in FIG. 14 and a face image display is selected.

When the "face image" is selected on the display information type menu, the employee number is designated from the name of employee in the employee master file 9b (step P8), and the face image corresponding to this employee number is called from the photograph-of-face file 9c (step P9). The face image is then displayed within a subwindow, as shown in FIG. 20 (step P10), and the flow then returns to step P4.

Figure 21:
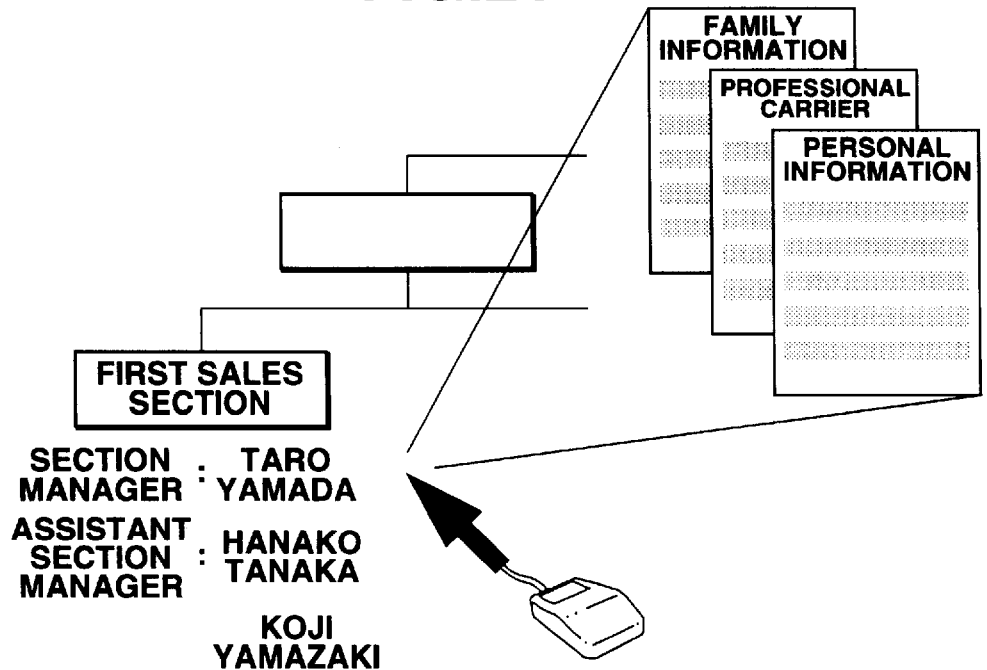
FIG. 21 is a view showing a display example when the employee position of a hierarchical image in the organization is designated in the collation processing in FIG. 14 and a personal information display is selected.

When the "personal information" is selected on the display information type menu in step P7, the personal information of the corresponding employee is called from the employee master file 9b (step P11), and the called personal information is displayed within the subwindow, as shown in FIG. 21 (step P10). The flow then returns to step P4.

Figure 22:
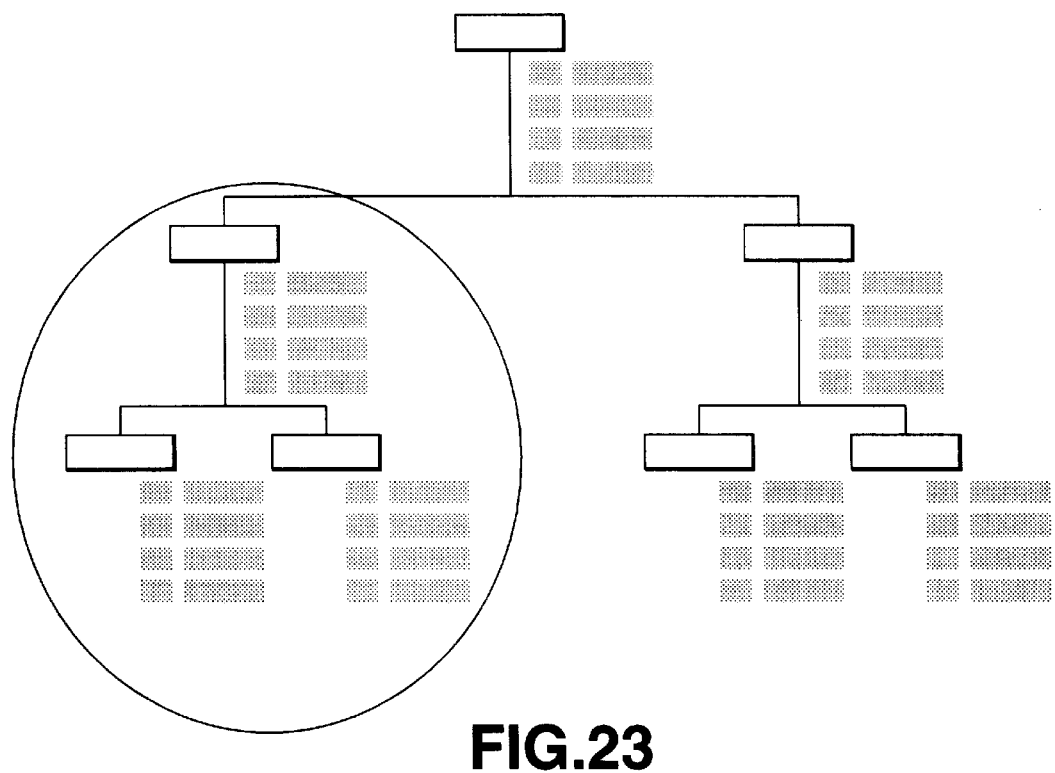
FIG. 22 is a view showing a display example when the target retrieval range of a hierarchical image in the organization is designated in the collation processing in FIG. 14.

When it is determined in step P5 that the display position designation does not represent the employee position, a prompt for designating an end position is displayed. When the end position is designated (step P12), the block within the designated range (FIG. 22) on the organization's hierarchical image surrounded by the designated end position is specified as the target retrieval range (step P13). A prompt for inputting a retrieval condition within the designated range is displayed. When a retrieval condition (e.g., the year of employment) is input (step P14), retrieval processing is performed under the input retrieval condition (the year of employment) in the employee master file 9b (step P15).

Figure 23:
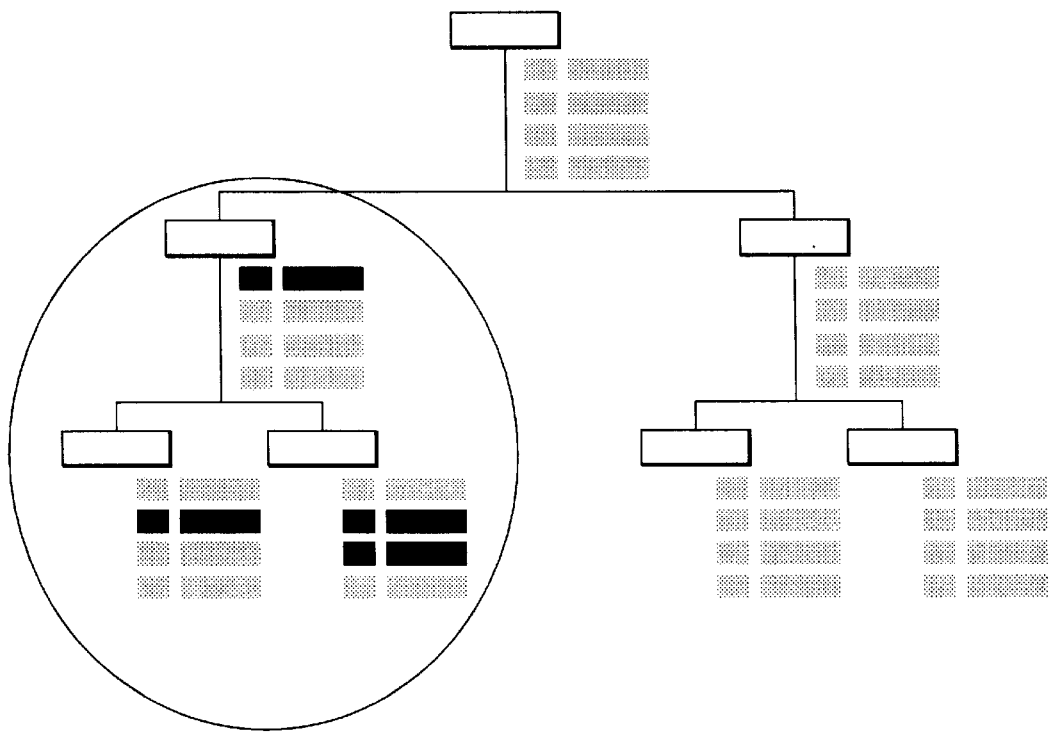
FIG. 23 is a view showing a display state obtained when the display color of the names of employees satisfying a retrieval condition in the target retrieval range in FIG. 22 is changed.

A flag is set in the retrieval flag column of a data line (FIG. 16) in the hierarchical table memory 8a which corresponds to an employee matching the retrieval condition within the hierarchical block specified as the above target retrieval range (step P16). As shown in FIG. 23, the display color of the display portion of the name of employee whose flag is set is changed and displayed on the displayed organization's hierarchical image (step P17). The flow then returns to step P4.

The flag set in the retrieval flag column of the data line in the hierarchical table memory 8a is reset when a new retrieval condition is input and new retrieval processing is started.

As described above, collation processing is repeatedly executed to confirm the face image or personal information of the designated employee on the organization's hierarchical image displayed on the display unit 12. At the same time, an employee matching a retrieval condition can be confirmed.

The post of the designated employee in the entire organization, the personal information of the designated employee, and the relationship between the target employees can be displayed on the same screen. The operator can easily grasp the collation information.

As a result, the above collation processing function is added to an application program having a data collation function of retrieving the personnel information database, so that the data collation function and efficient utilization of the application program using this personnel information database can be improved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A record processing apparatus for processing a plurality of records, comprising:

means for storing the plurality of records each having attribute information representing a hierarchical connection relationship with another record and having (i) a higher connection code representing connection to a record having a higher connection relationship in a hierarchical relationship and (ii) a lower connection code representing connection to a record having a lower connection relationship:

means for, when display data having a one-to-one correspondence with each record is to be displayed on a display screen in a hierarchical state, determining a display position of the display data on said display screen based on the attribute information included in each record, and displaying the display data corresponding to each record at the determined display position;

means for arbitrarily selecting desired first display data of all display data displayed on said display screen in the hierarchical state and arbitrarily designating a destination display position of the selected first display data, thereby moving the selected first display data to the destination display position;

means for detecting a change in hierarchical display position relationship between each display position of each display data displayed on said display screen in the hierarchical state and display positions of the selected first display data before and after movement of the selected first display data; and means for changing attribute information of a record corresponding to the selected first display data in accordance with the change in hierarchical display position relationship detected by said detecting means, said changing means comprising:

means for searching the hierarchical display position relationship between the moved display position of the selected first display data and display positions of other display data displayed on said display screen in the hierarchical state;

means for specifying, based on the hierarchical display position relationship searched by said searching means, second display data at a display position having a hierarchical display position relationship toward a higher hierarchical level of the moved display position of the selected first display data, and third display data at a display position having a hierarchical display position relationship toward a lower hierarchical level; and means for changing the lower connection code included in attribute information of a record corresponding to the specified second display data into a change for designating the record corresponding to the first display data, and changing the higher connection code included in attribute information of a record corresponding to the specified third display data into a code for designating the record corresponding to the first display data.

2. A record processing apparatus for processing a plurality of records, comprising:

means for storing the plurality of records each having attribute information representing a hierarchical connection relationship with another record and having (i) a higher connection code representing connection to a record having a higher connection relationship in a hierarchical relationship and (ii) a lower connection code representing connection to a record having a lower connection relationship;

means for, when display data having a one-to-one correspondence with each record is to be displayed on a display screen in a hierarchical state, determining a display position of the display data on said display screen based on the attribute information included in each record, and displaying the display data corresponding to each record at the determined display position;

means for arbitrarily selecting desired first display data of all display data displayed on said display screen in the hierarchical state and arbitrarily designating a destination display position of the selected first display data, thereby moving the selected first display data to the destination display position;

means for detecting a change in hierarchical display position relationship between each display position of each display data displayed on said display screen in the hierarchical state and display positions of the selected first display data before and after movement of the selected first display data; and means for changing attribute information of a record corresponding to the selected first display data in accordance with the change in hierarchical display position relationship detected by said detecting means, said changing means comprising:

first search means for searching a hierarchical display position relationship between the moved display position of the selected first display data and display positions of other display data displayed on said display screen in the hierarchical state;

first specifying means for specifying, based on the hierarchical display position relationship searched by said first search means, second display data at a display position having a hierarchical display position relationship toward a higher hierarchical level of the moved display position of the selected first display data;

first changing means for changing the lower connection code included in the attribute information of the record corresponding to the specified second display data into a code for designating the record corresponding to the selected first display data;

second search means for searching a hierarchical display position relationship between the display position of the selected first display data before the movement of the selected first display data and display positions of other display data displayed on said display screen in the hierarchical state;

second specifying means for specifying, based on the hierarchical display position relationship searched by said second search means, fourth display data at a display position having a higher hierarchical display position relationship with the display position of the selected first display data before the movement of the selected first display data; and second changing means for deleting a lower connection code included in attribute information of a record corresponding to the specified fourth display data, or changing the lower connection code into a code for designating another record.

3. An article of manufacture comprising a computer usable medium having computer readable program code means embodied therein for causing a plurality of records to be processed, the computer readable program code means in said article of manufacture comprising:

computer readable program code means for causing a computer to store the plurality of records each having attribute information representing a hierarchical connection relationship with another record and having (i) a higher connection code representing connection to a record having a higher connection relationship in a hierarchical relationship and (ii) a lower connection code representing connection code representing connection to a record having a lower connection relationship;

computer readable program code means for causing a computer to, when display data having a one-to-one correspondence with each record is to be displayed on a display screen in a hierarchical state, determine a display position of the display data on said display screen based on the attribute information included in each record, and to display data corresponding to each record at the determined display position;

computer readable program code means for causing a computer to arbitrarily select desired first display data of all display data displayed on said display screen in the hierarchical state and arbitrarily designate a destination display position of the selected first display data, thereby moving the selected first display data to the destination display position;

computer readable program code means for causing a computer to detect a change in hierarchical display position relationship between each display position of each display data displayed on said display screen in the hierarchical state and display positions of the selected first display data before and after movement of the selected first display data; and computer readable program code means for causing a computer to change attribute information of a record corresponding to the selected first display data in accordance with the change in hierarchical display position relationship detected by said detecting means, and including:

computer readable program code means for causing a computer to search the hierarchical display position relationship between the moved display position of the selected first display data and display positions of other display data displayed on said display screen in the hierarchical state;

computer readable program code means for causing a computer to specify, based on the hierarchical display position relationship searched by said searching program code means, second display data at a display position having a hierarchical display position relationship toward a higher hierarchical level of the moved display position of the selected first display data, and third display data at a display position having a hierarchical display position relationship toward a lower hierarchical level; and computer readable program code means for causing a computer to change the lower connection code included in attribute information of a record corresponding to the specified second display data into a change for designating the record corresponding to the first display data, and to change the higher connection code included in attribute information of a record corresponding to the specified third display data into a code for designating the record corresponding to first display data.

* * * * *